(12) United States Patent
Shibayama

(10) Patent No.: US 6,304,389 B1
(45) Date of Patent: Oct. 16, 2001

(54) VARIABLE FOCAL LENGTH LENS SYSTEM

(75) Inventor: Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/630,586

(22) Filed: Aug. 1, 2000

(30) Foreign Application Priority Data

Aug. 3, 1999 (JP) .................................................. 11-220000

(51) Int. Cl.⁷ .............................. G02B 15/14; G02B 3/02
(52) U.S. Cl. ........................... 359/689; 359/676; 359/708
(58) Field of Search .................................. 359/554–557, 359/676–677, 682–683, 685, 689

(56) References Cited

U.S. PATENT DOCUMENTS

| | | | | |
|---|---|---|---|---|
| 5,262,897 | * | 11/1993 | Kawamura | 359/689 |
| 5,434,710 | * | 7/1995 | Zozawa | 359/689 |
| 5,550,679 | * | 8/1996 | Sugawara | 359/676 |
| 5,909,318 | * | 6/1999 | Tanaka | 359/689 |

FOREIGN PATENT DOCUMENTS 6-94996   4/1994  (JP) .
7-261083  10/1995 (JP) .

* cited by examiner

*Primary Examiner*—Thong Nguyen
(74) *Attorney, Agent, or Firm*—Miles & Stockbridge P.C.

(57) ABSTRACT

The present invention makes it possible to provide a variable focal length lens system having a zoom ratio of 2.5 or over, a field angle of 60° or over at the wide-angle end, and an excellent imaging quality which is suited for use with a video camera and the like. According to one aspect of the present invention, a variable focal length lens system has, in order from an object side, a first negative lens group G1, a second positive lens group G2, and a third positive lens group G3. The first lens group includes, in order from the object side, a negative lens unit 1-1 U11 and a positive lens unit 1-2 U12 separated by predetermined air space; and the second lens group includes, in order from the object side, a positive lens unit 2-1 U21, a negative lens unit 2-2 U22 separated by predetermined air space, and a positive lens unit 2-3 U23 separated by predetermined air space, with the first and second lens groups being moved such that when a state of the lens group positions is changed from a wide-angle end state to a telephoto end state, a space between the first and second lens group is decreased and a space between the second and third lens groups is increased while the third lens group is fixed, and further with designated conditional equations being satisfied.

11 Claims, 24 Drawing Sheets

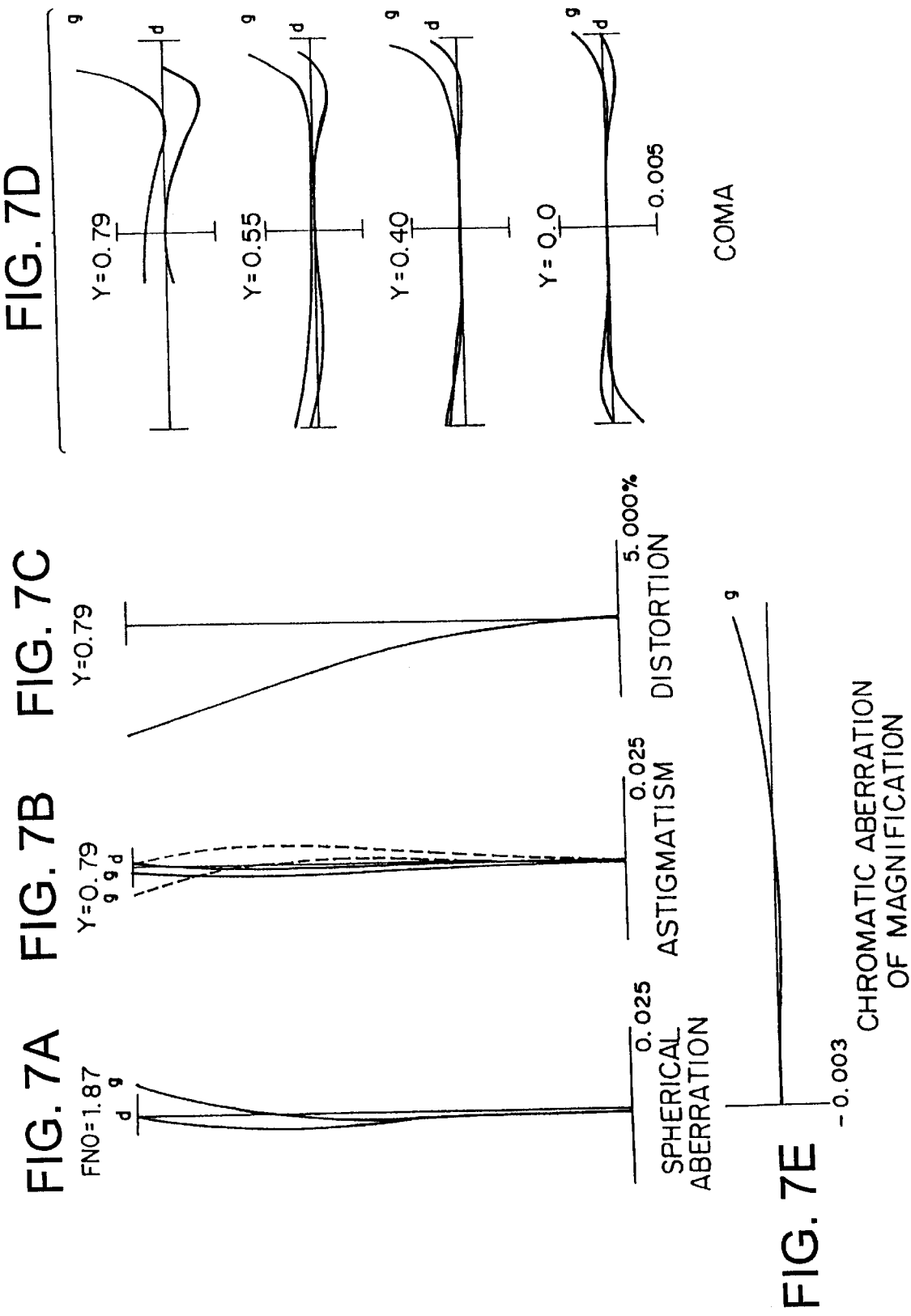

Figures 8A, 8B, 8C, 8D, 8E:
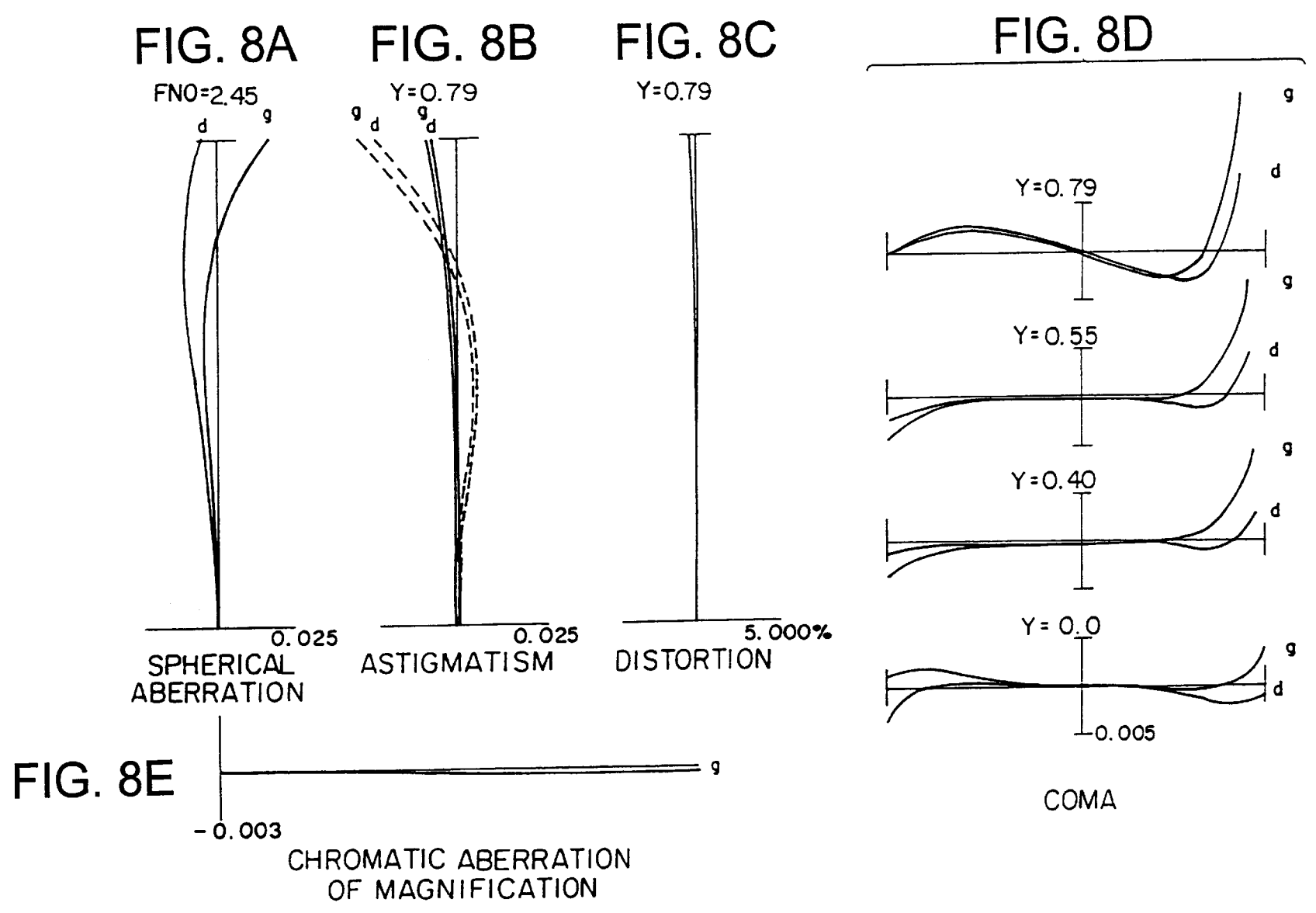

FIG. 8A FNO=2.45 SPHERICAL ABERRATION

FIG. 8B Y=0.79 ASTIGMATISM

FIG. 8C Y=0.79 DISTORTION

FIG. 8D COMA
Y=0.79
Y=0.55
Y=0.40
Y=0.0

FIG. 8E CHROMATIC ABERRATION OF MAGNIFICATION

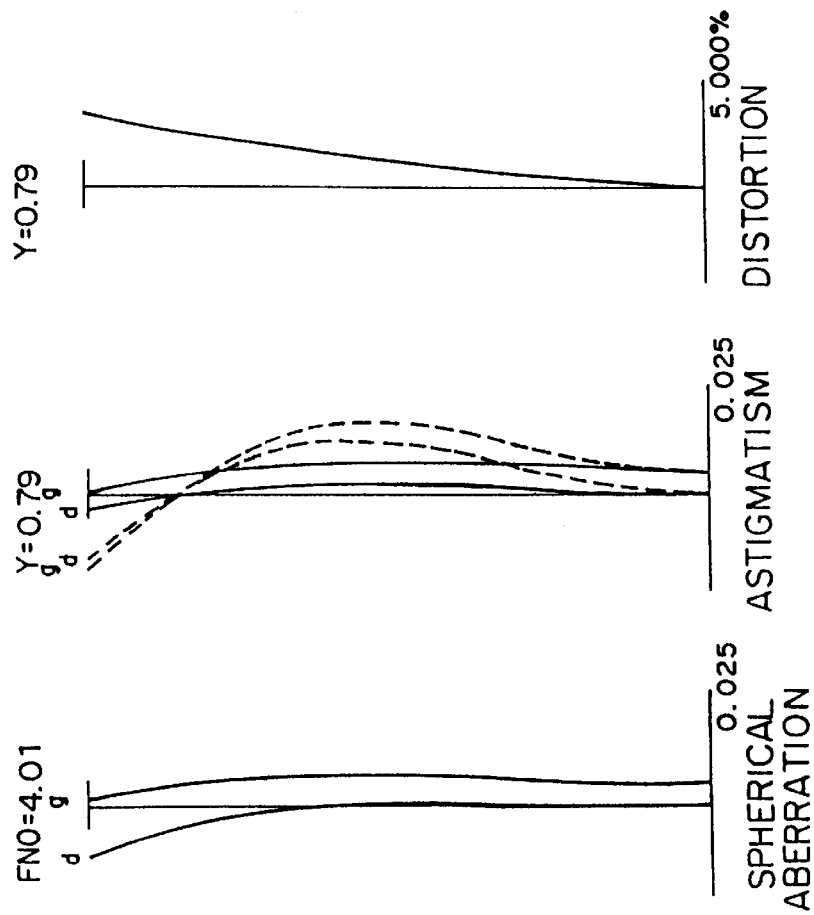

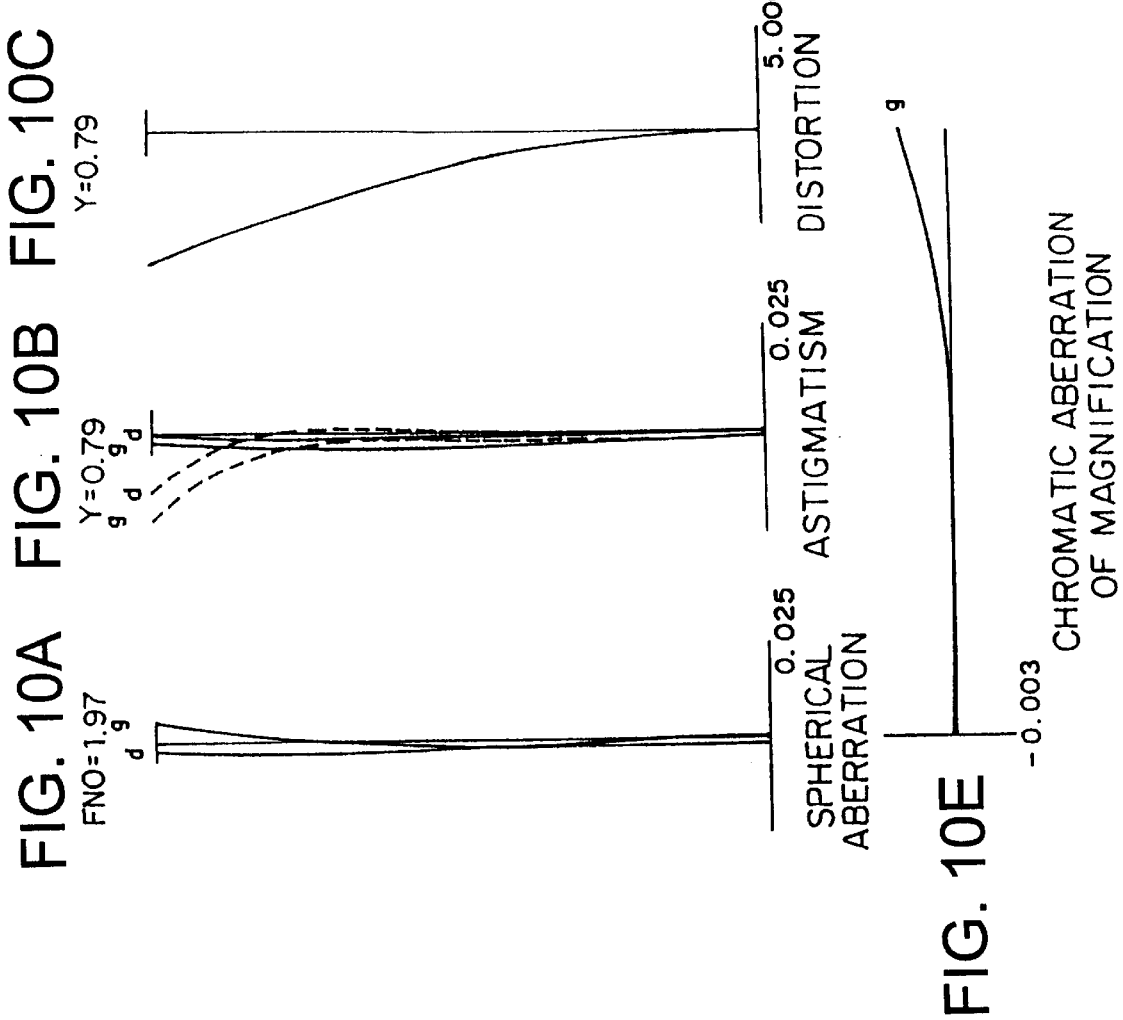

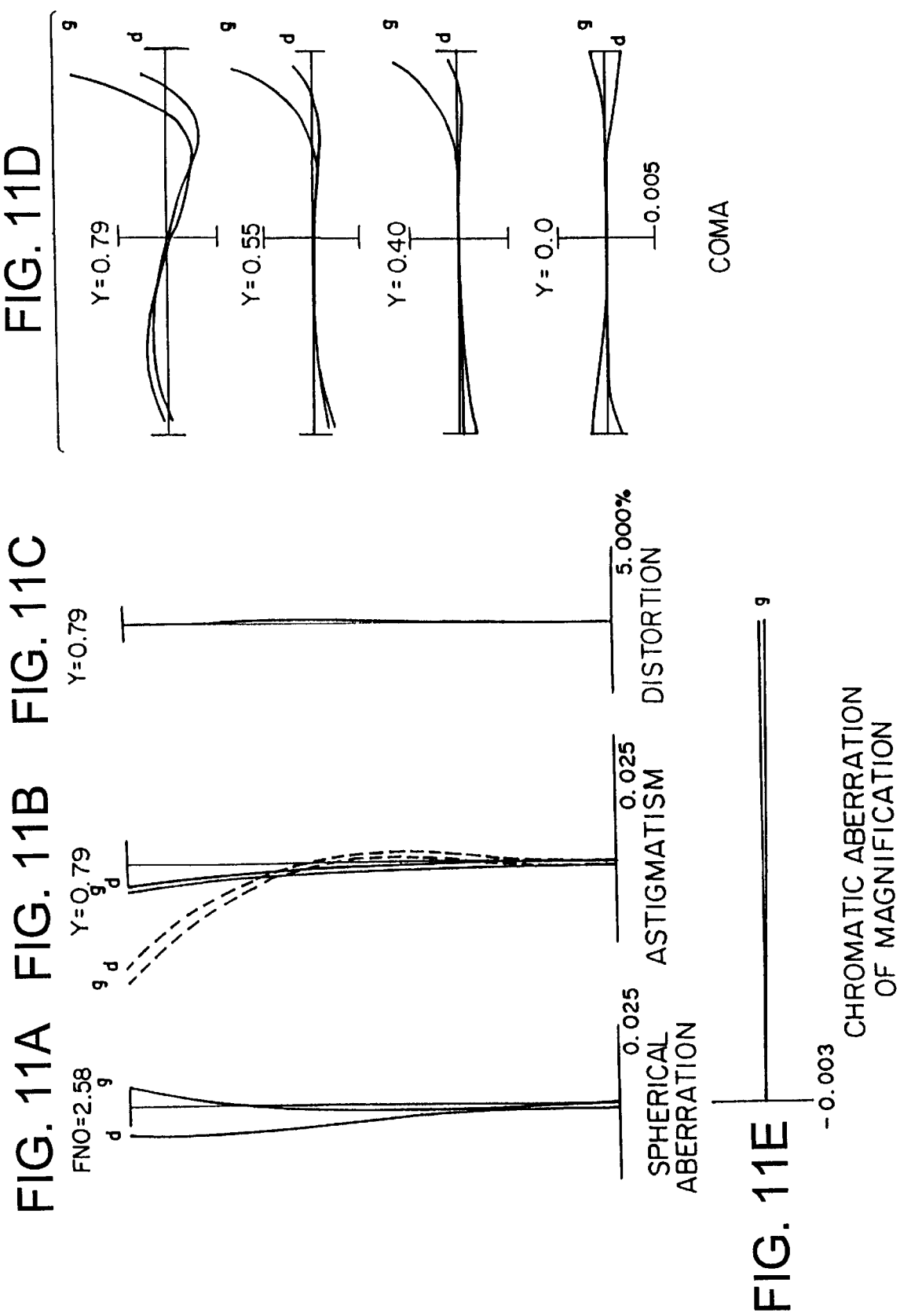

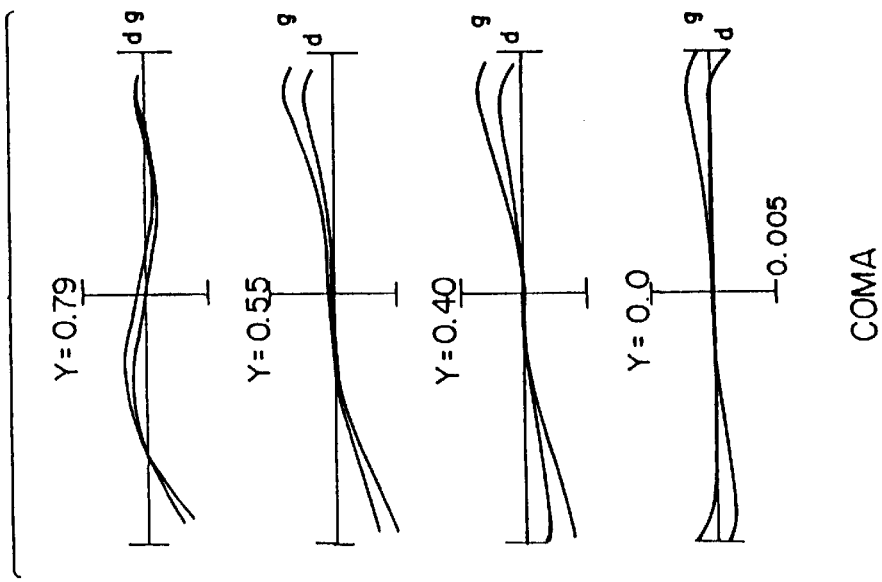
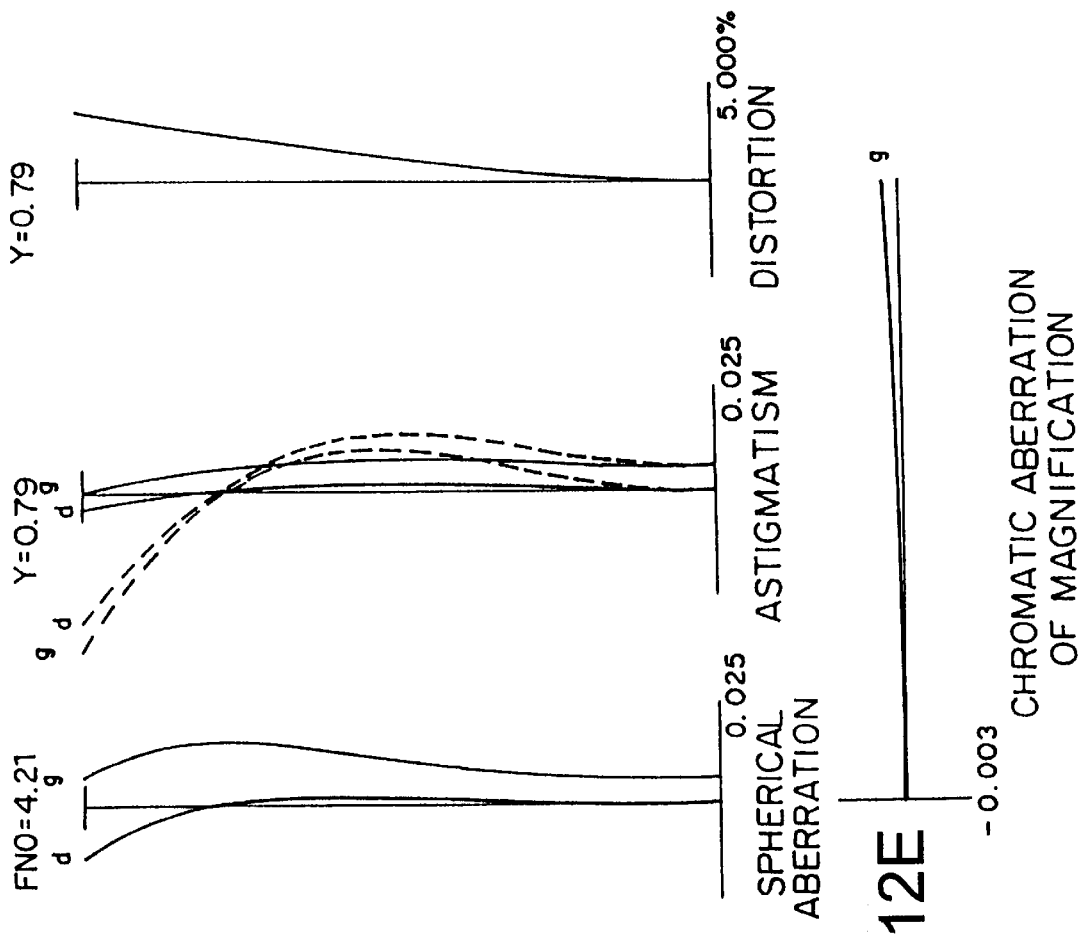

FIG. 13A FIG. 13B FIG. 13C FIG. 13D

FNO=2.14 Y=0.80 Y=0.80

Y=0.80
Y=0.56
Y=0.40
Y=0.0

|—0.025 |—0.025 |—5.000% |—0.005

SPHERICAL ASTIGMATISM DISTORTION COMA
ABERRATION

FIG. 13E

|—−0.003

CHROMATIC ABERRATION
OF MAGNIFICATION

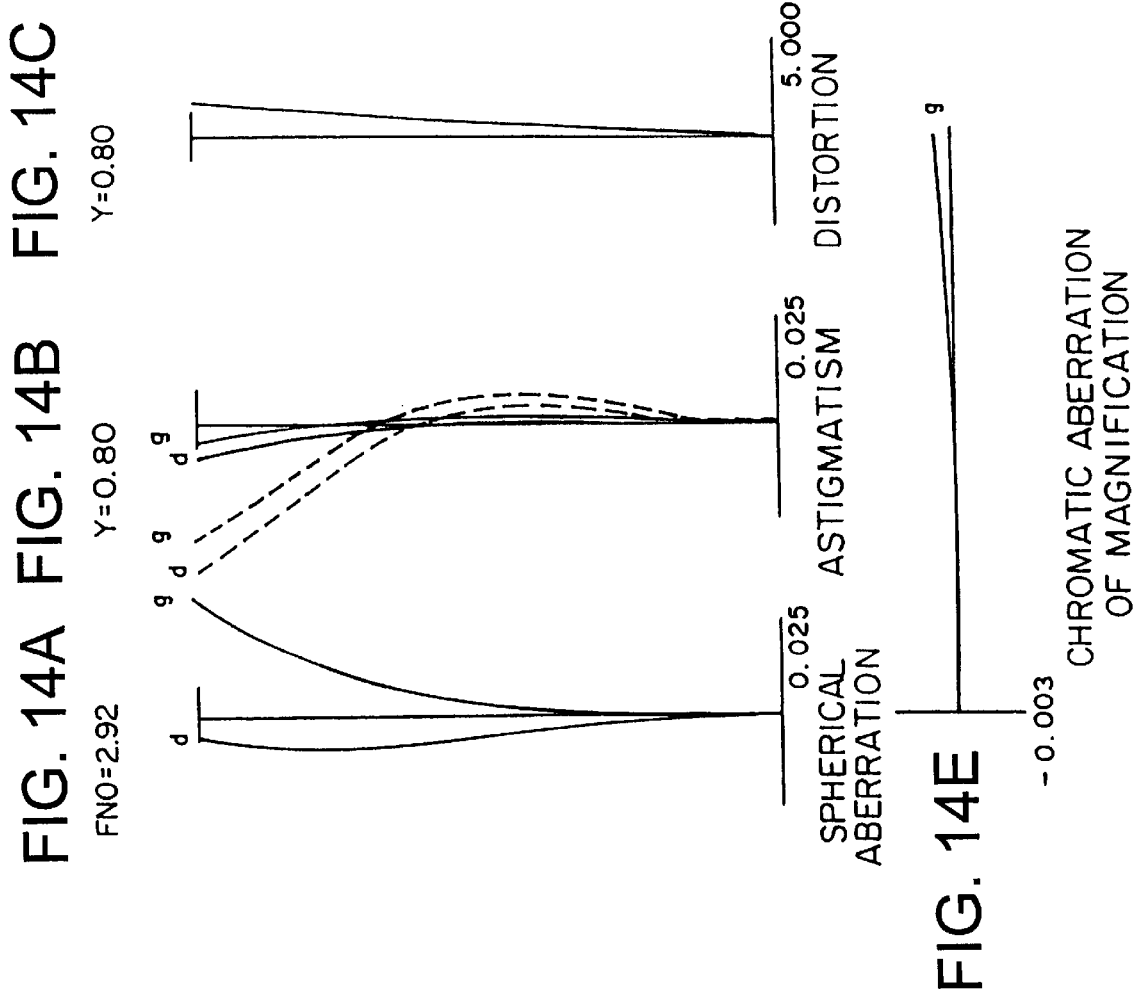

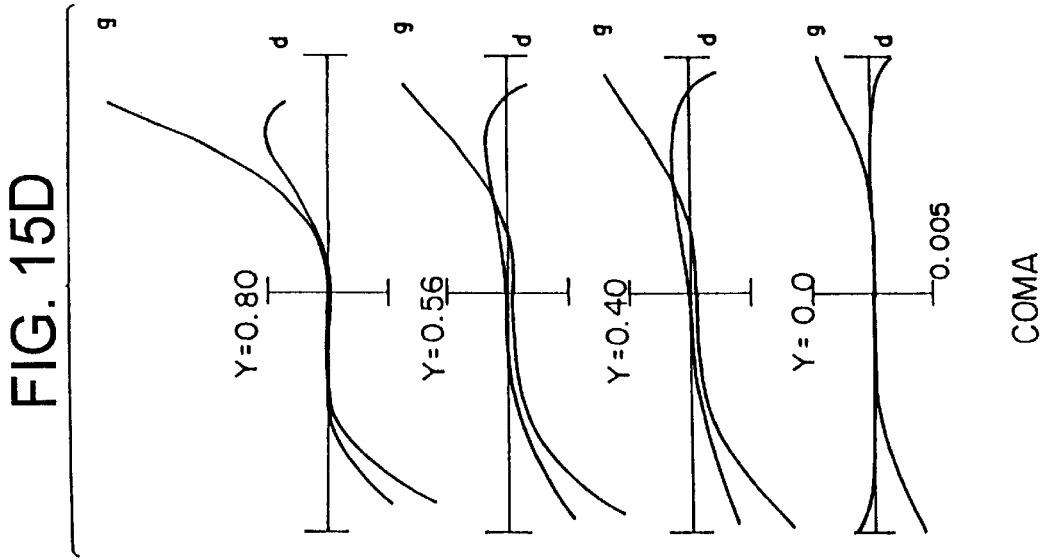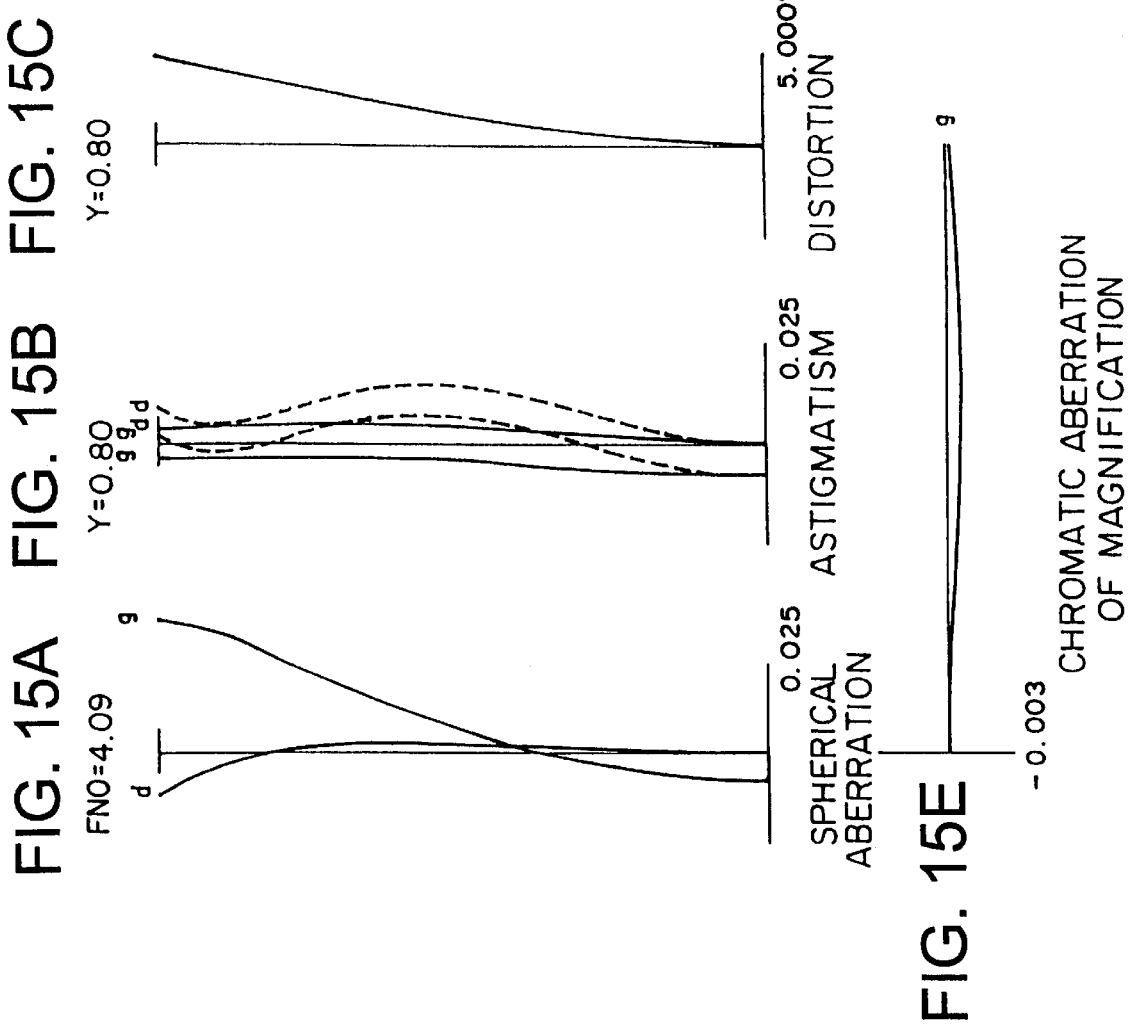

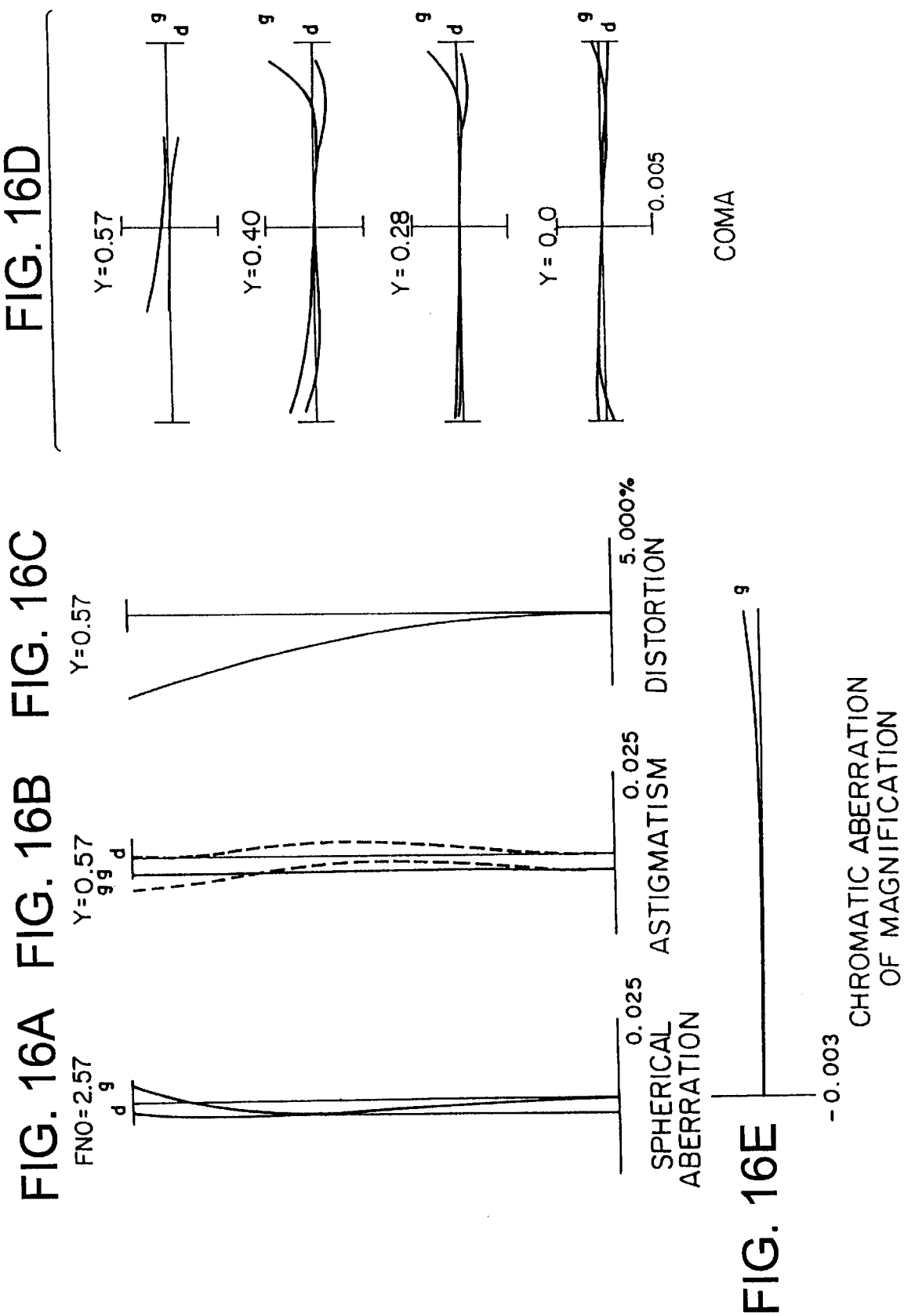

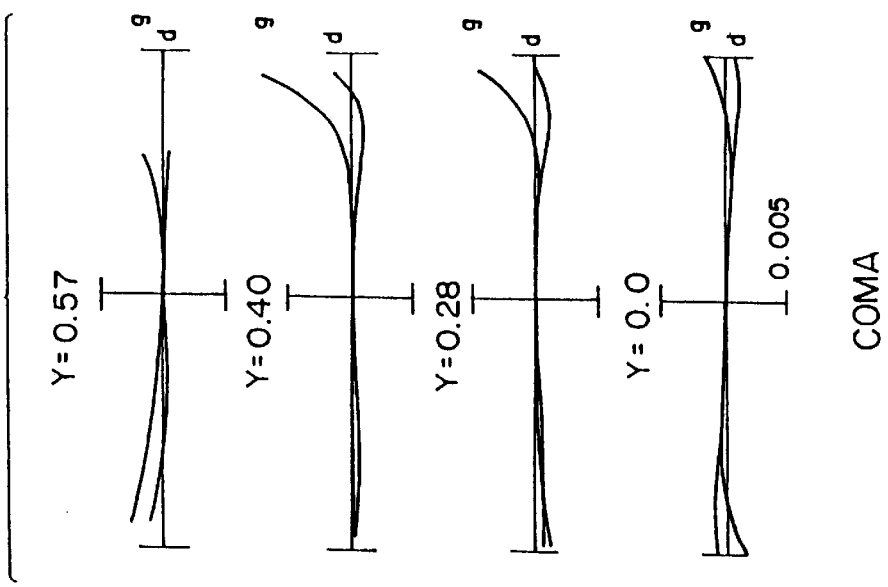
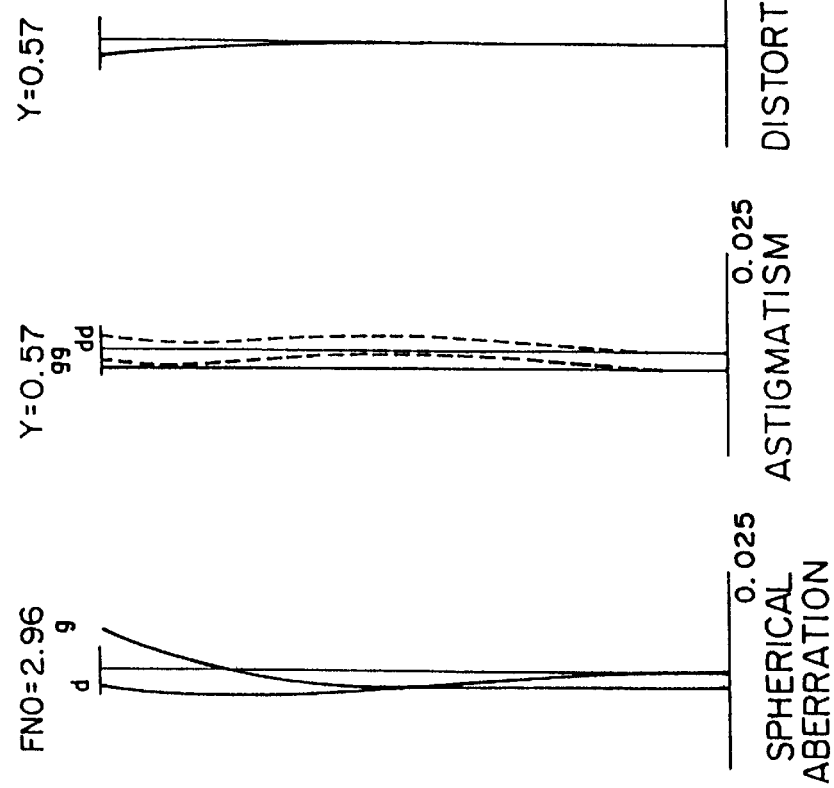

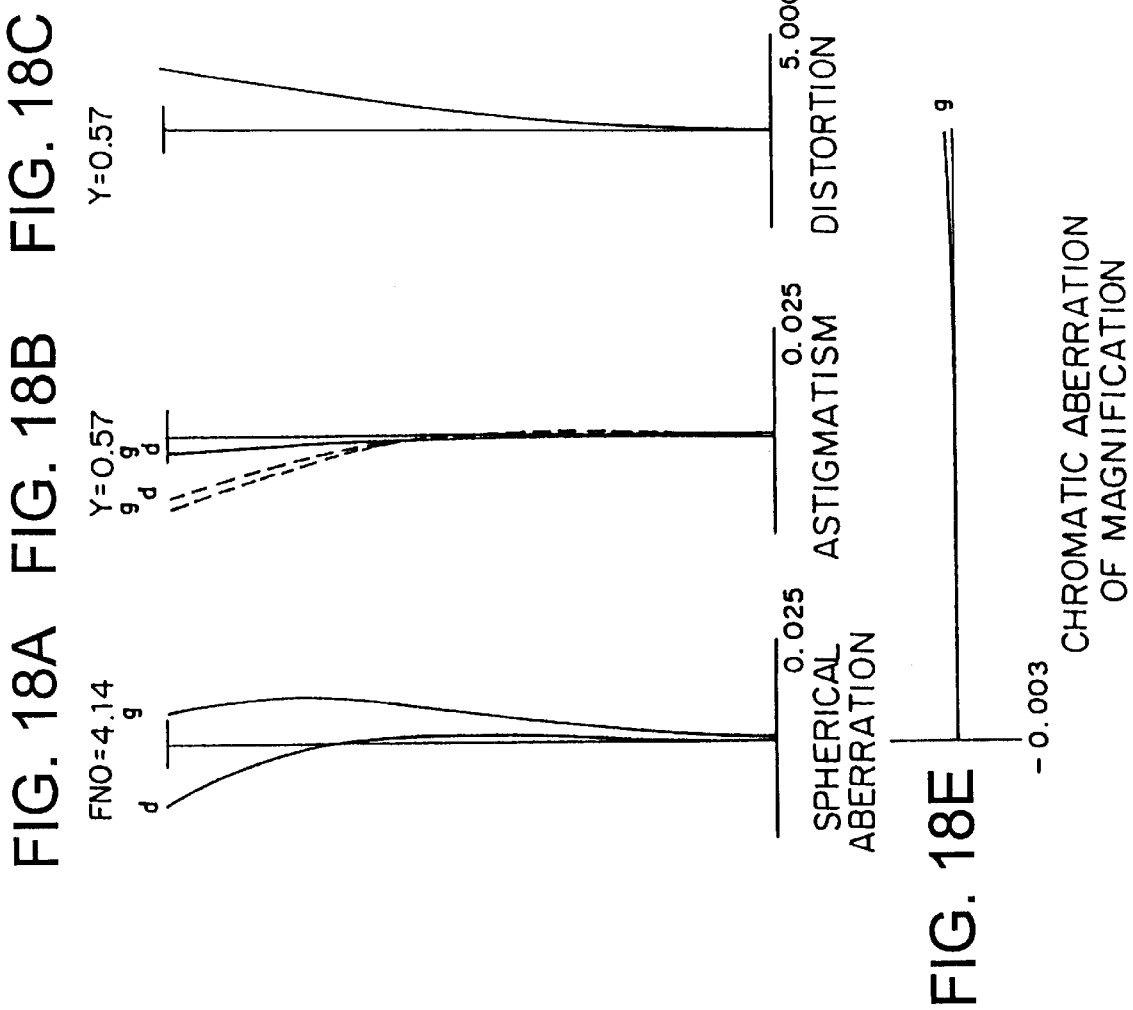

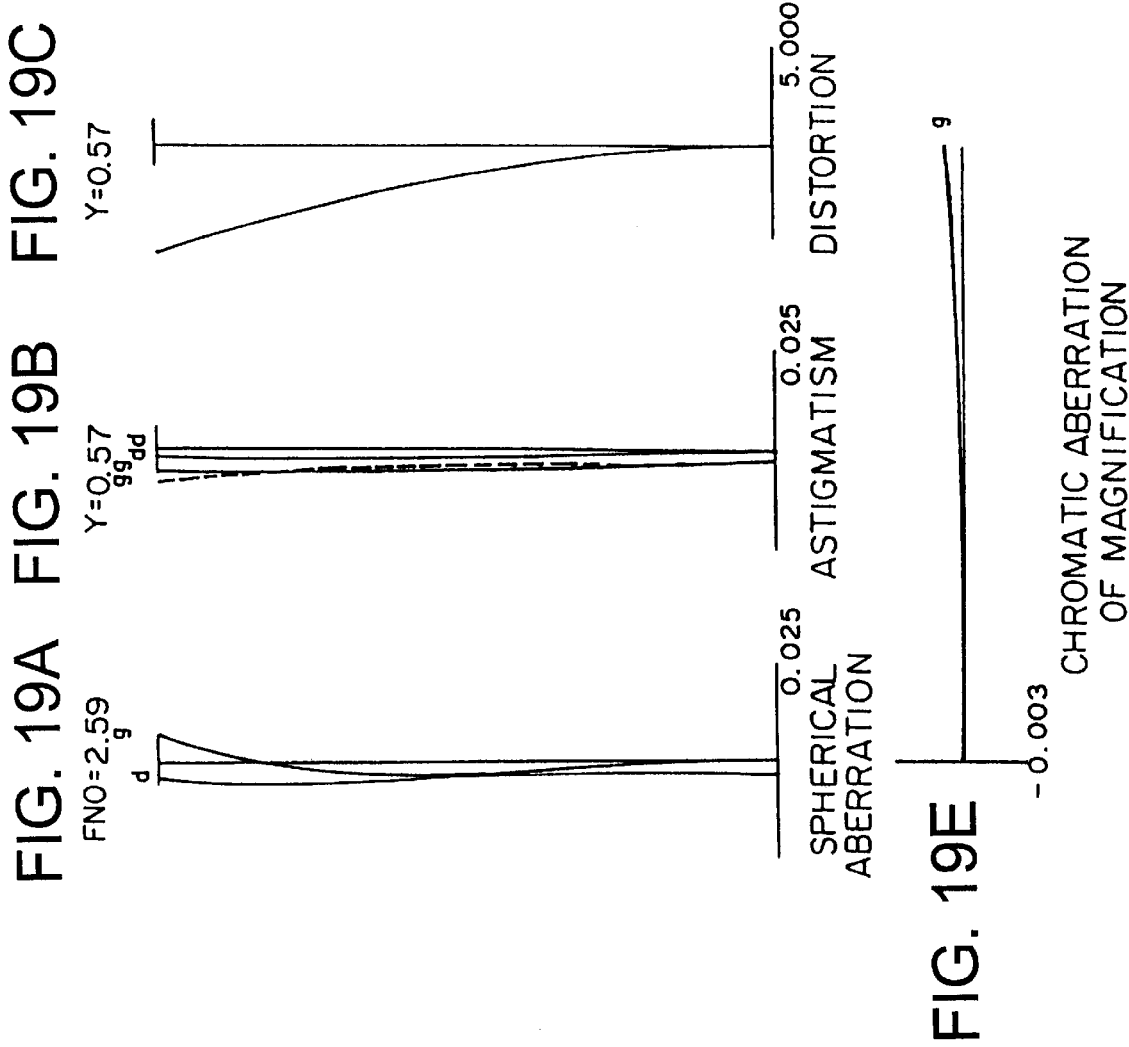

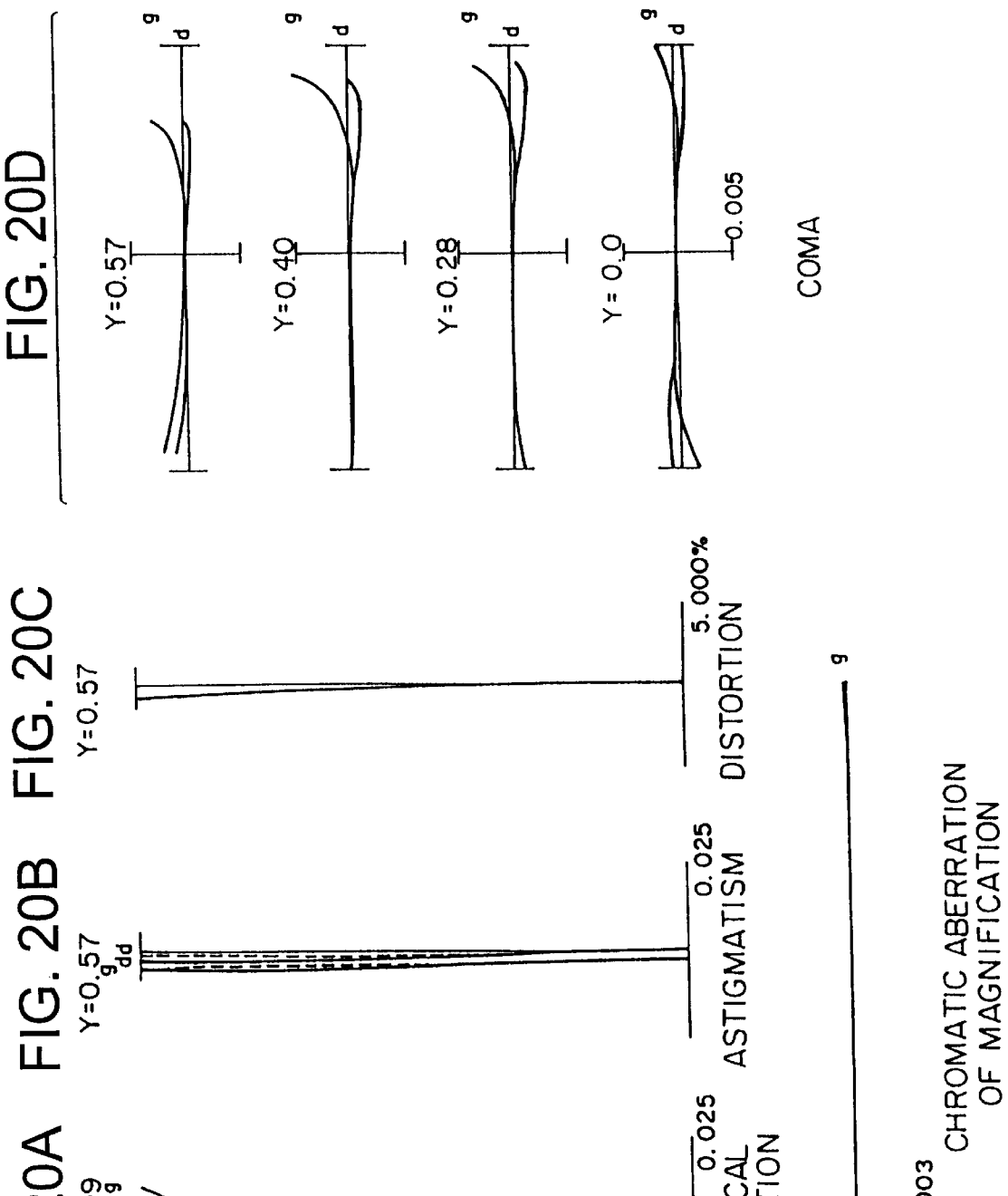

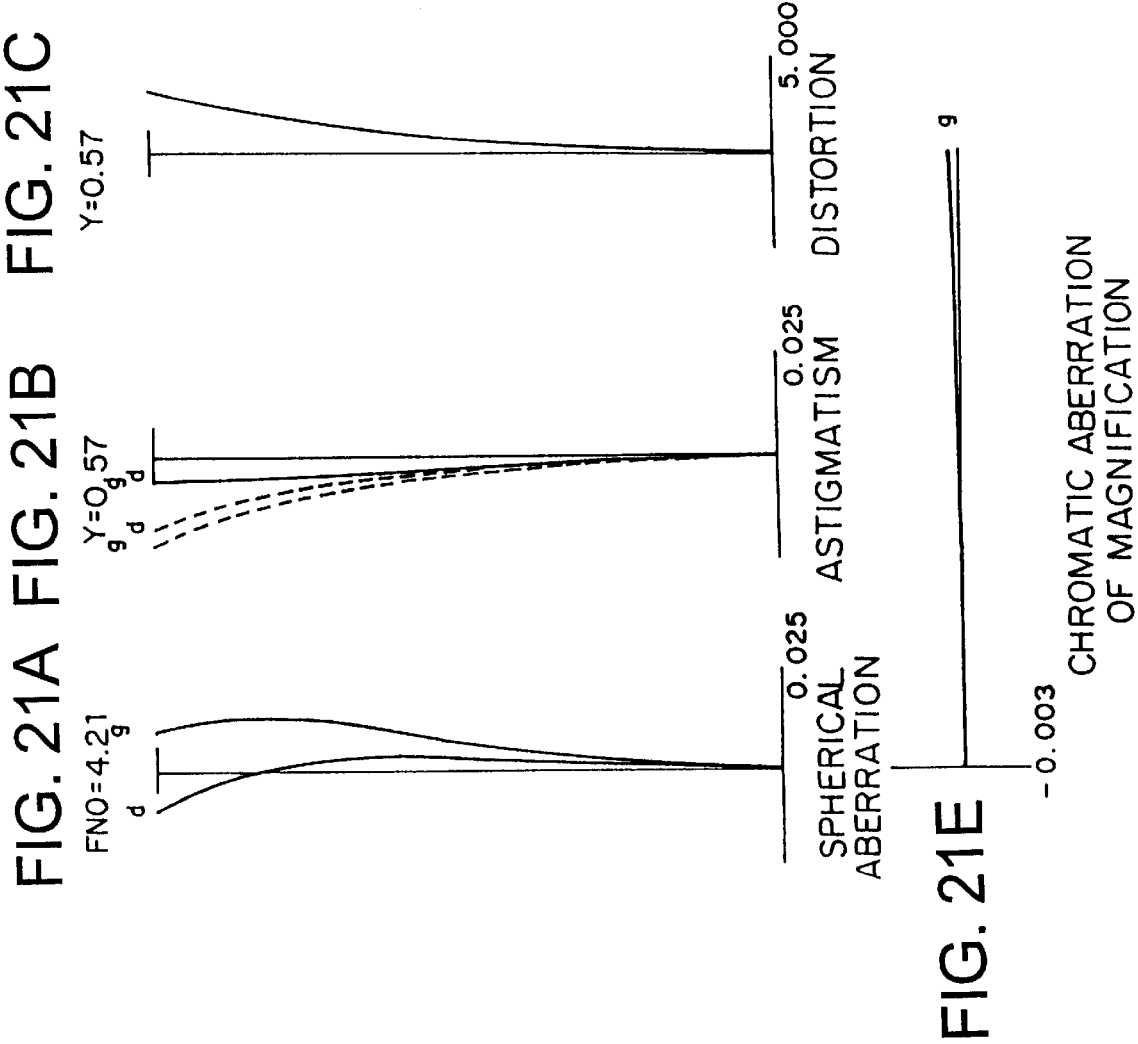

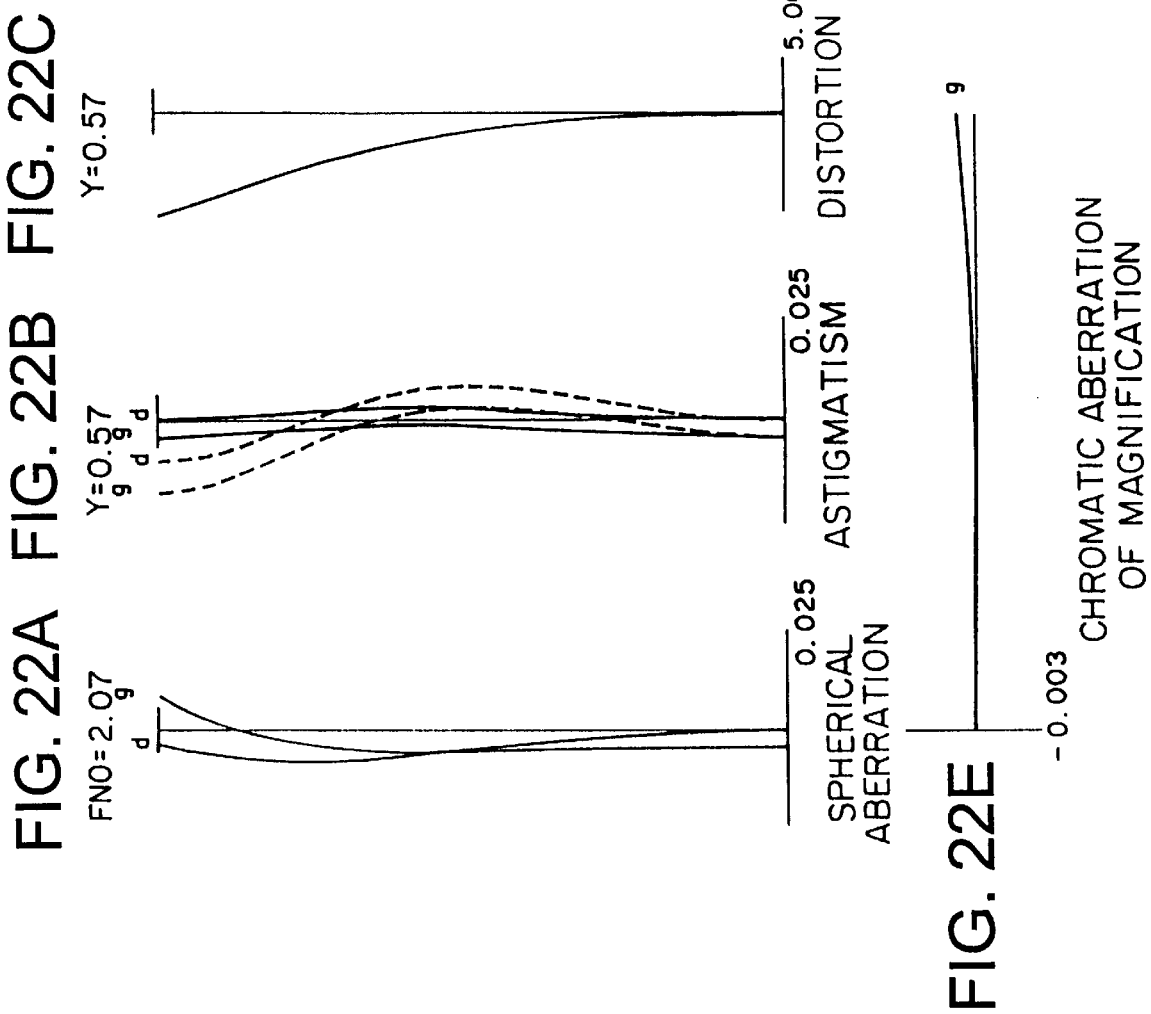

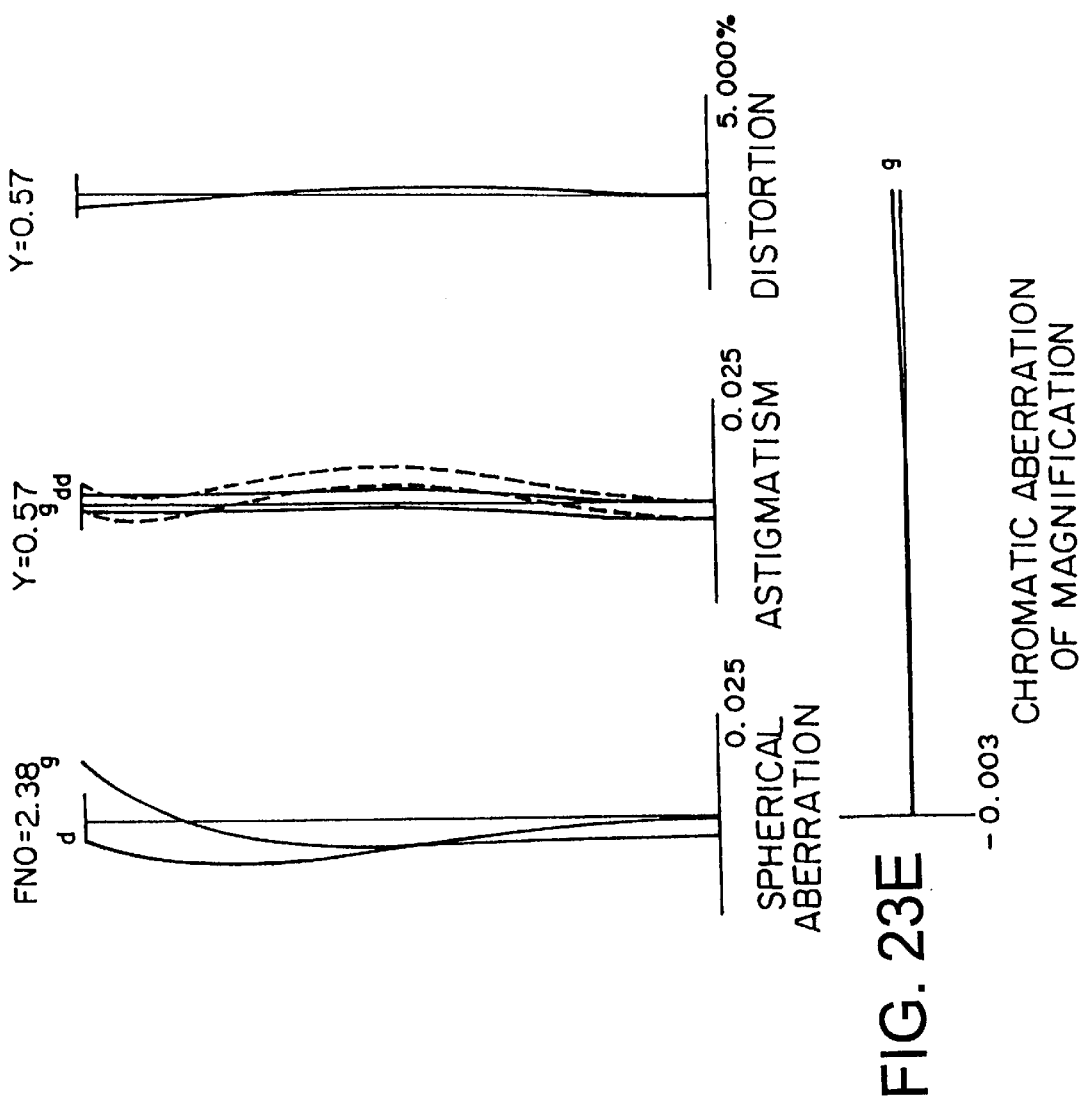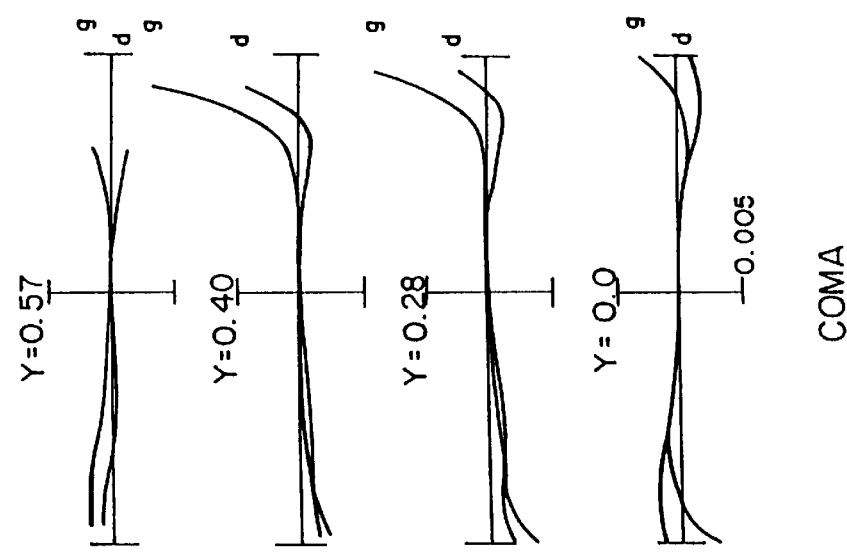

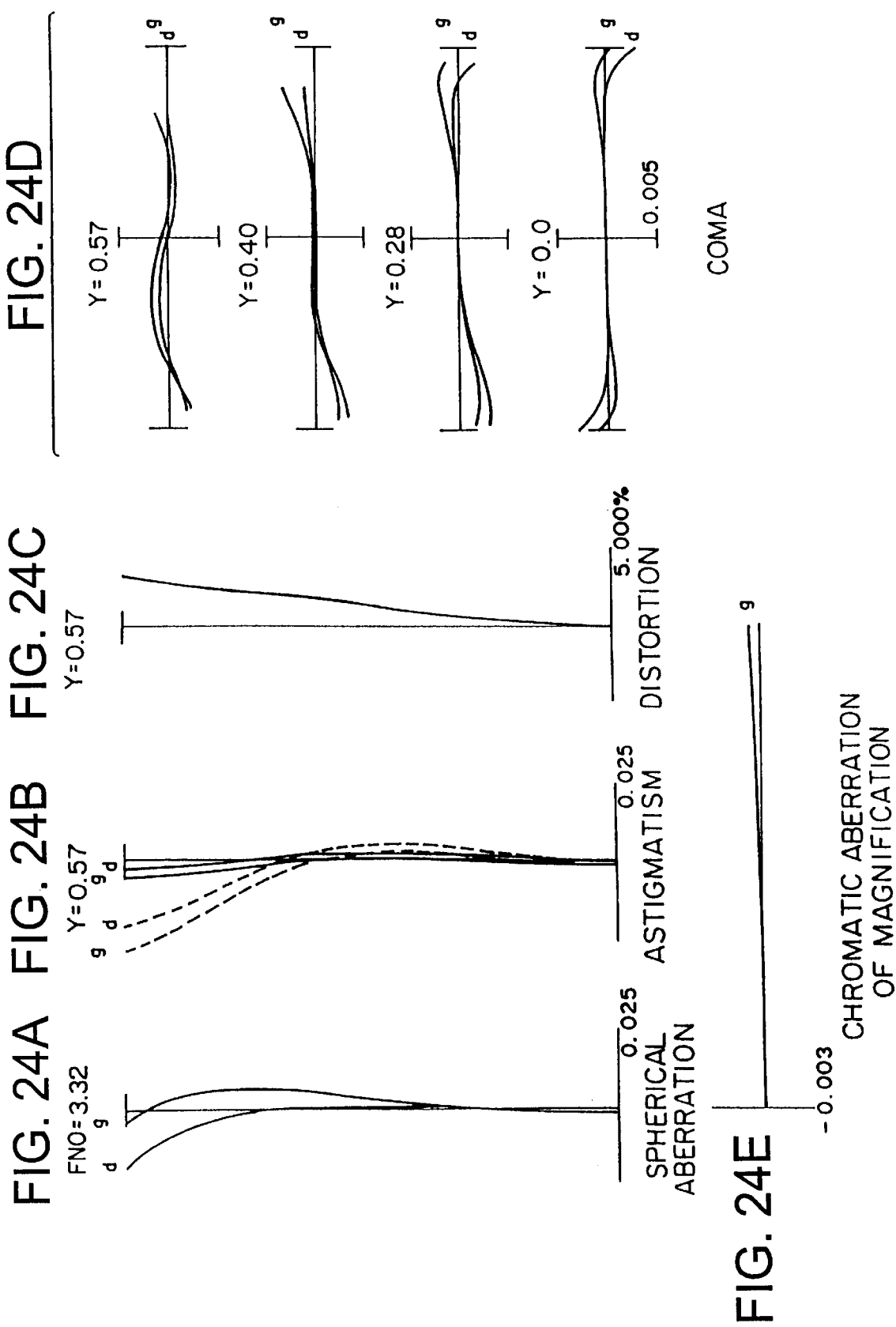

VARIABLE FOCAL LENGTH LENS SYSTEM

This application claims the benefit of Japanese Application No. 11-220000 which is hereby incorporated by reference.

FIELD OF THE INVENTION

The present invention relates to a variable focal length lens system and, in particular, to a variable focal length lens system having a zoom ratio of 2.5 or over, a field angle of 60° or over at the wide-angle end, and an excellent imaging quality which is suited for use with a video camera or a digital still camera employing a solid-state imaging device and the like.

BACKGROUND OF THE INVENTION

Variable focal length lens systems suitable for use with a solid-state imaging device have been disclosed in the Japanese Patent Laid-Open Publication No. 6-94996 and in the Japanese Patent Laid-Open Publication No.7-261083, etc.

Every one of embodiments disclosed in the Japanese Patent Laid-Open Publication No. 6-94996, however, has a zoom ratio such as about 2, and it is not sufficient.

In each embodiment disclosed in the Japanese Patent Laid-Open Publication No. 7-261083, the zoom ratio is about 2.3, and it is still not sufficient. Further, a variation of spherical aberration in accordance with zooming is large and imaging quality is not sufficient as shown in aberration charts disclosed in the publication.

SUMMARY OF THE INVENTION

The present invention is made in view of aforementioned problems, and has an object to provide a variable focal length lens system having a zoom ratio of 2.5 or over, a field angle of 60° or over at the wide-angle end, and an excellent imaging quality which is suited for use with a video camera or a digital still camera employing solid-state imaging device and the like.

In order to solve the problems, a variable focal length lens system according to the present invention has; in order from an object side, a first lens group having negative refractive power, a second lens group having positive refractive power, and a third lens group having positive refractive power; wherein the first lens group includes, in order from the object side, a lens unit 1-1 having negative refractive power and a lens unit 1-2 having positive refractive power separated by predetermined air space; and wherein the second lens group includes, in order from the object side, a lens unit 2-1 having positive refractive power, a lens unit 2-2 having negative refractive power separated by predetermined air space, and a lens unit 2-3 having positive refractive power separated by predetermined air space; wherein the first and second lens groups are moved such that when a state of the lens group positions is changed from a wide-angle end state (a state providing the shortest focal length of the lens system) to a telephoto end state (a state providing the longest focal length of the lens system), a space between the first and second lens groups is decreased and a space between the second and third lens groups is increased while the third lens group is fixed; and wherein the following conditions is satisfied:

| | | |
|---|---|---|
| $0.7 < f2 / |f1| < 1.5$ | $(f1 < 0)$ | (1) |
| $3 < f3 / fw < 10$ | | (2) |
| $1 < f12 / |f1| < 3$ | $(f1 < 0)$ | (3) |
| $1 < |f22| / f2 < 5$ | $(f22 < 0)$ | (4) |
| $1.6 < (D1w - D1t) / fw < 6$ | | (5) |
| $1.6 < (D2t - D2w) / fw < 6$ | | (6) | where f1 denotes the focal length of the first lens group, f2 denotes the focal length of the second lens group, f3 denotes the focal length of the third lens group, fw denotes the focal length of the lens system at the wide-angle end state, f12 denotes the focal length of the lens unit 1-2, f22 denotes the focal length of the lens unit 2-2, D1w denotes the space between the first lens group and the second lens group at the wide-angle end state, D1t denotes the space between the first lens group and the second lens group at the telephoto end state, D2w denotes the space between the second lens group and the third lens group at the wide-angle end state, and D2t denotes the space between the second lens group and the third lens group at the telephoto end state.

BRIEF DESCRIPTION OF THE DRAWINGS

FIGS. 7A–7E show various aberrations of Embodiment 1 according to the present invention in the wide-angle end state.

FIGS. 8A–8E show various aberrations of Embodiment 1 according to the present invention in the intermediate focal length state.

FIGS. 9A–9E show various aberrations of Embodiment 1 according the present invention in the telephoto end state.

FIGS. 10A–10E show various aberrations of Embodiment 2 according to the present invention in the wide-angle end state.

FIGS. 11A–11E show various aberrations of Embodiment 2 according to the present invention in the intermediate focal length state.

FIGS. 12A–12E show various aberrations of Embodiment 2 according to the present invention in the telephoto end state.

FIGS. 13A–13E show various aberrations of Embodiment 3 according to the present invention in the wide-angle end state.

FIGS. 14A–14E show various aberrations of Embodiment 3 according to the present invention in the intermediate focal length state.

FIGS. 15A–15E show various aberrations of Embodiment 3 according to the present invention in the telephoto end state.

FIGS. 16A–16E show various aberrations of Embodiment 4 according to the present invention in the wide-angle end state.

FIGS. 17A–17E show various aberrations of Embodiment 4 according to the present invention in the intermediate focal length state.

FIGS. 18A–18E show various aberrations of Embodiment 4 according to the present invention in the telephoto end state.

FIGS. 19A–19E show various aberrations of Embodiment 5 according to the present invention in the wide-angle end state.

FIGS. 20A–20E show various aberrations of Embodiment 5 according to the present invention in the intermediate focal length state.

FIGS. 21A–21E show various aberrations of Embodiment 5 according the present invention in the telephoto end state.

FIGS. 22A–22E show various aberrations of Embodiment 6 according to the present invention in the wide-angle end state.

FIGS. 23A–23E show various aberrations of Embodiment 6 according to the present invention in the intermediate focal length state.

FIGS. 24A–24E show various aberrations of Embodiment 6 according to the present invention in the telephoto end state.

DESCRIPTION OF THE PREFERRED EMBODIMENTS

Figure 1:
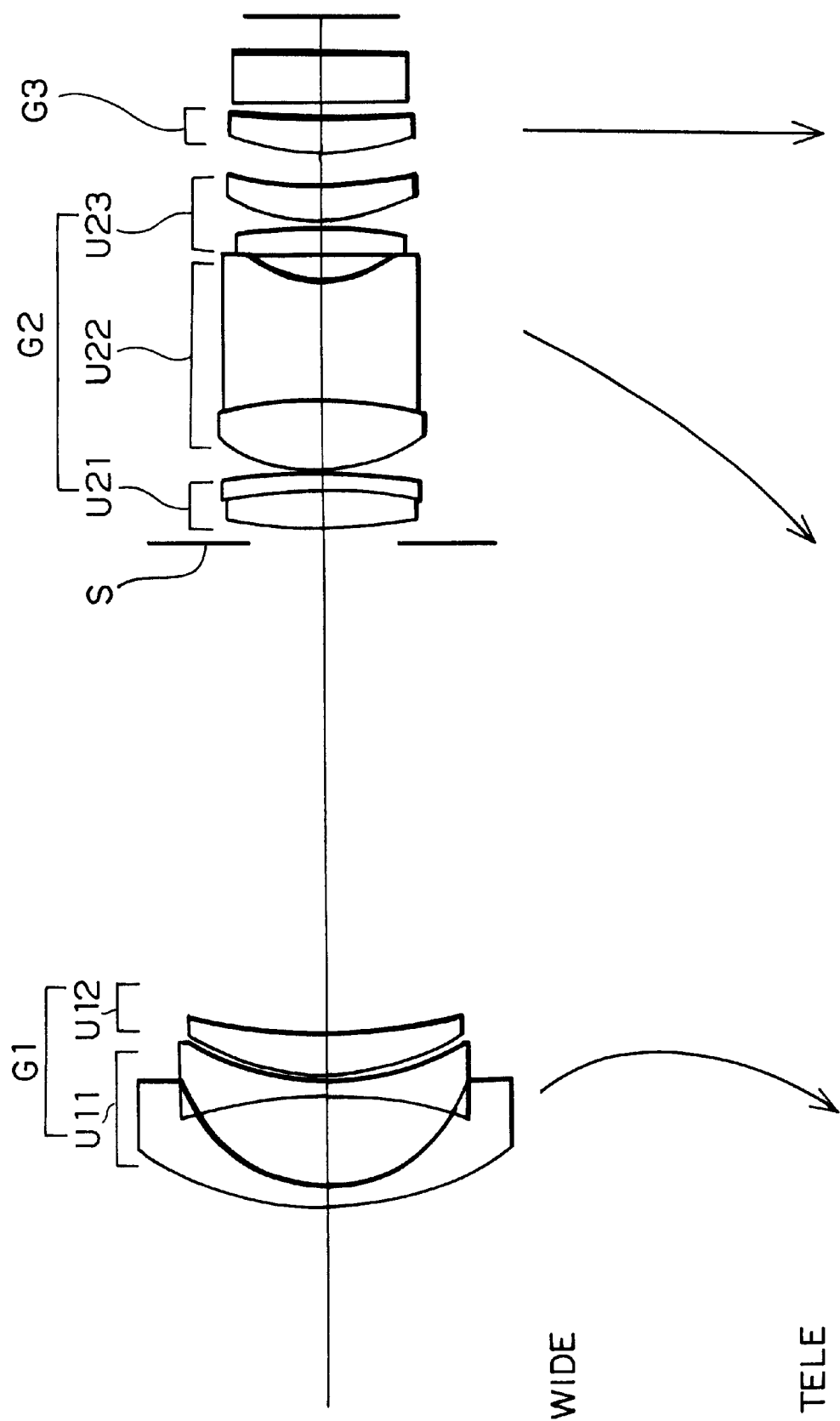
FIG. 1 is a view schematically showing the lens configuration of a variable focal length lens system according to Embodiment 1 of the present invention.

In the present invention, by constructing the first lens group having negative refractive power and the second lens group having positive refractive power, it is possible to provide a variable focal length lens system having a field angle of 60° or over at the wide-angle end state, whose first lens group is made to be compact. Moreover, by arranging the third lens group, the exit pupil can be effectively positioned further away from the image plane suitable for use with a solid-state imaging device.

Furthermore, with the first lens group being constructed, in order from the object side, with the lens unit 1-1 having negative refractive power, and the lens unit 1-2 having positive refractive power separated from the lens unit 1-1 by predetermined air space, imaging quality of the lens system can be excellent and, particularly, lateral chromatic aberration and distortion can be corrected well.

Moreover, with the second lens group being constructed, in order from the object side, with the lens unit 2-1 having positive refractive power, the lens unit 2-2 having negative refractive power separated from the lens unit 2-1 by predetermined air space, and the lens unit 2-3 having positive refractive power separated from the lens unit 2-2 by predetermined air space, variations in spherical aberration and astigmatism at the time of zooming can be suppressed, and, as a result, excellent imaging performance can be obtained.

Further, with the third lens group arranged to the most image side being constructed to be fixed while zooming, it is preferable that a zooming mechanism can separately be arranged from an electronic circuit connected with the solid-state imaging device.

Now, each conditional equation will be explained. Conditional equation (1) is for providing a variable focal length lens system having a zoom ratio of around 2.5 or over with excellent imaging quality and compactness. When the ratio of f2/|f1| falls below the lower limit of conditional equation (1), it will be difficult to obtain required zoom ratio. In other words, the variation in the space between the first and second lens group while zooming becomes excessively large, so that the lens system cannot be compact any more. On the other hand, when the ratio exceeds the upper limit of conditional equation (1), corrections of distortion, lateral chromatic aberration and field curvature become difficult, so that excellent imaging quality becomes difficult to obtain with simple construction. Moreover, the lower and upper limits of conditional equation (1) are preferably set to be 0.9 and 1.3, respectively, in order to enable excellent correction of various aberrations.

Conditional equation (2) is for properly positioning the exit pupil of the lens system and for accomplishing compactness of the lens system. When the ratio of f3/fw exceeds the upper limit of conditional equation (2), the position of the exit pupil approaches to the image plane at the wide-angle end state, so that the lens system becomes difficult to be applied to the solid-state imaging device. On the other hand, when the ratio falls below the lower limit of conditional equation (2), the construction of the third lens group becomes complicated and the first and second lens group become large, so that it becomes difficult to make the lens system compact. Further, the lower and upper limits of conditional equation (2) are preferably set to be 4 and 6 respectively.

Conditional equation (3) defines an appropriate range of the focal length of the lens unit 1-2. When the ratio of f12/|f1| exceeds the upper limit of conditional equation (3), the refractive power of the lens unit 1-2 becomes weak, so that it becomes difficult to correct spherical aberration and chromatic aberration. Conversely, when the ratio falls below the lower limit of conditional equation (3), the refractive power of the lens unit 1-2 becomes strong, so that allowances of the air space between the lens unit 1-1 and the lens unit 1-2 and of decentering become severe. Further, the lower and upper limits of conditional equation (3) are preferably set to be 1.2 and 2.3, respectively.

Conditional equation (4) defines an appropriate range of the focal length of the lens unit 2-2. When the ratio of |f22|/f2 exceeds the upper limit of conditional equation (4), the refractive power of the lens unit 2-2 becomes weak, so that it becomes difficult to correct spherical aberration. Conversely, when the ratio falls below the lower limit of conditional equation (4), the refractive power of the lens unit 2-2 becomes strong, so that allowances of the air space adjacent to the lens unit 2-2 and of decentering become severe. Further, the lower and upper limits of conditional equation (4) are preferably set to be 1.1 and 4, respectively.

Conditional equation (5) defines an appropriate range of variation in the air space between the first and second lens groups when a state of the lens group positions is changed from the wide-angle end state to the telephoto end state. When the ratio of (D1w−D1t)/fw exceeds the upper limit of conditional equation (5), the variation in air space between the first and second lens groups while zooming becomes large, so that the lens system becomes large. On the other hand, when the ratio falls below the lower limit of conditional equation (5), sufficient zoom ratio cannot be maintained. Further, the lower and upper limits of conditional equation (5) are preferably set to be 1.9 and 5.5, respectively.

Conditional equation (6) defines an appropriate range of variation in the air space between the second and third lens groups when a state of the lens group positions is changed from the wide-angle end state to the telephoto end state. When the ratio of (D2t−D2w)/fw exceeds the upper limit of conditional equation (6), the variation in air space between the second and third lens group while zooming becomes large, so that the lens system becomes large. On the other hand, when the ratio falls below the lower limit of conditional equation (6), sufficient zoom ratio cannot be maintained. Further, the lower and upper limits of conditional equation (6) are preferably set to be 1.9 and 5.5, respectively.

Furthermore, under above-described construction, it is preferable for the present invention to have a construction that the lens unit 1-1 is composed of, in order from the object side, a negative meniscus lens having a convex surface facing to the object side and a double concave lens, and that the lens unit 1-2 is composed of a positive meniscus lens having a convex surface facing to the object side. As a result, excellent imaging performance can be obtained with a small number of lens elements.

Further, in the present invention, it is preferable to introduce an aspherical plane to the most object side of the lens unit 1-1. As a result, distortion of the lens system at the wide-angle end state can effectively be corrected.

Furthermore, in the present invention, it is preferable for the lens unit 2-2 to be constructed a cemented lens consisting of, in order from the object side, a double convex positive lens and a double concave negative lens. As a result, both relaxation of decentering tolerance regarding the lens elements in the second lens group and good correction of aberration can be effectively accomplished at a same time.

Moreover, in the present invention, it is preferable for the third lens group to be constructed with a positive single lens having at least one aspherical surface. As a result, coma can be corrected well without complicating construction of the third lens group, so that both compactness of the zoom lens system and good correction of aberration can be accomplished at a same time.

Figure 2:
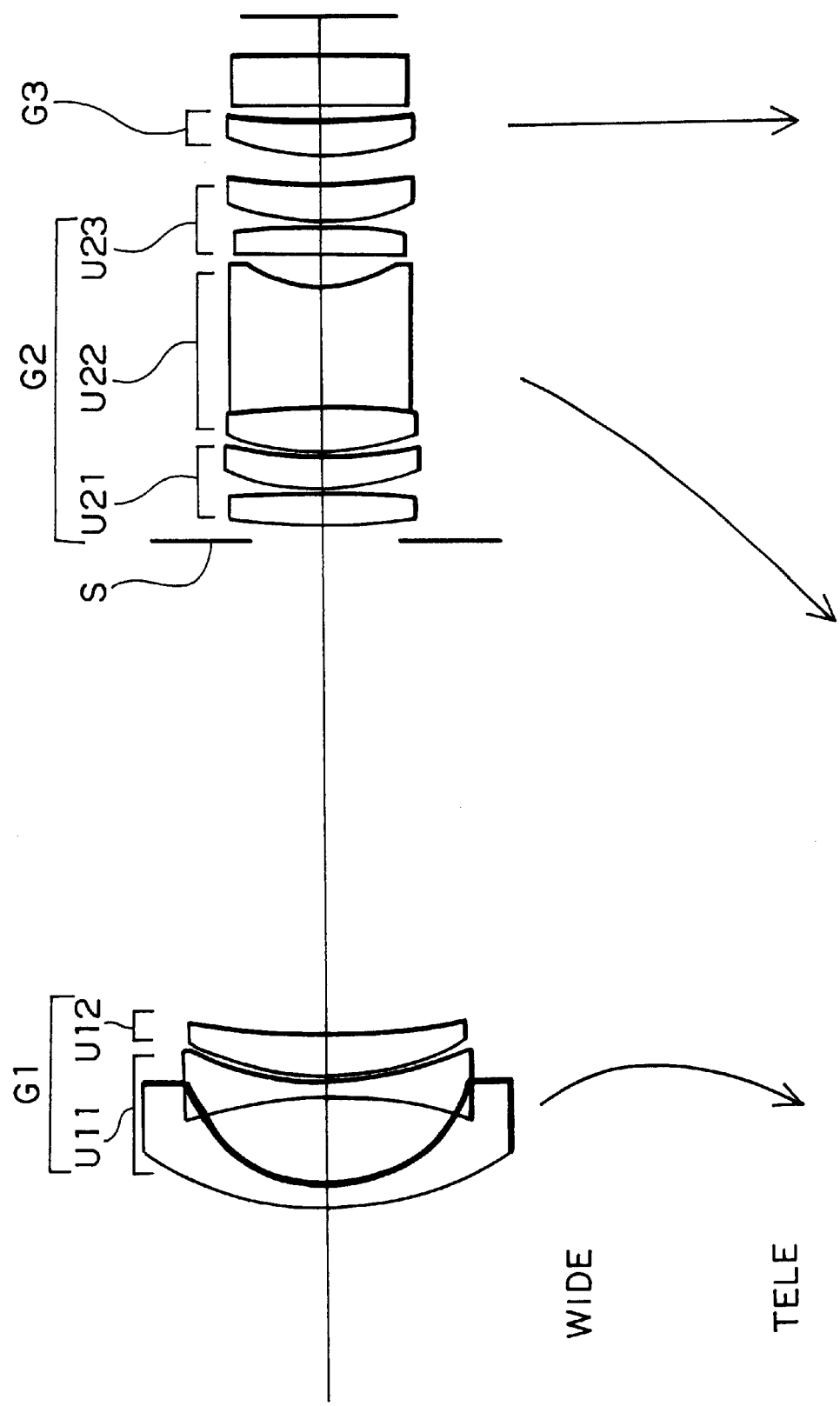
FIG. 2 s a view schematically showing the lens configuration of a variable focal length lens system according to Embodiment 2 of the present invention.
Figure 3:
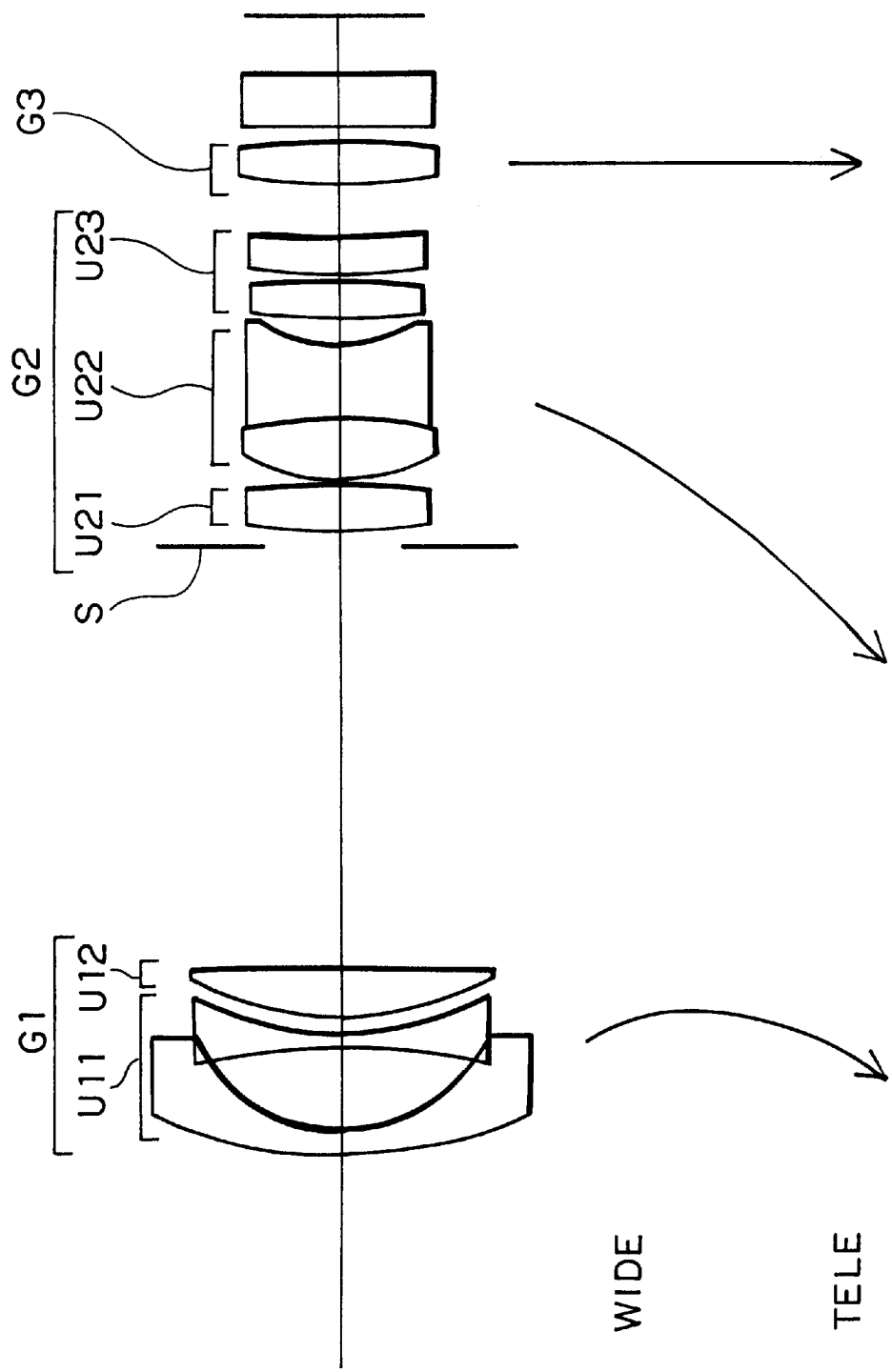
FIG. 3 is a view schematically showing the lens configuration of a variable focal length lens system according to Embodiment 3 of the present invention.
Figure 4:
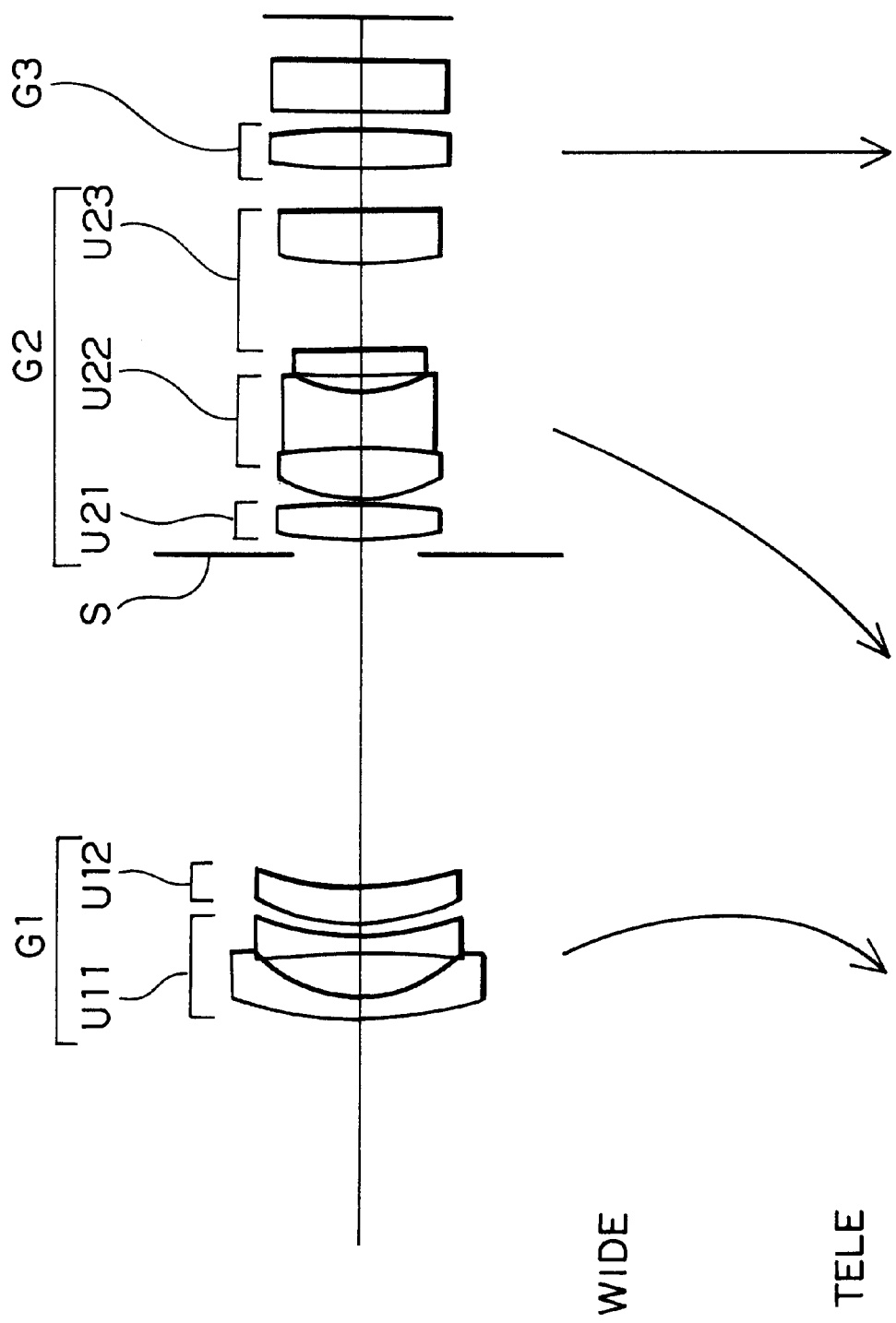
FIG. 4 is a view schematically showing the lens configuration of a variable focal length lens system according to Embodiment 4 of the present invention.
Figure 5:
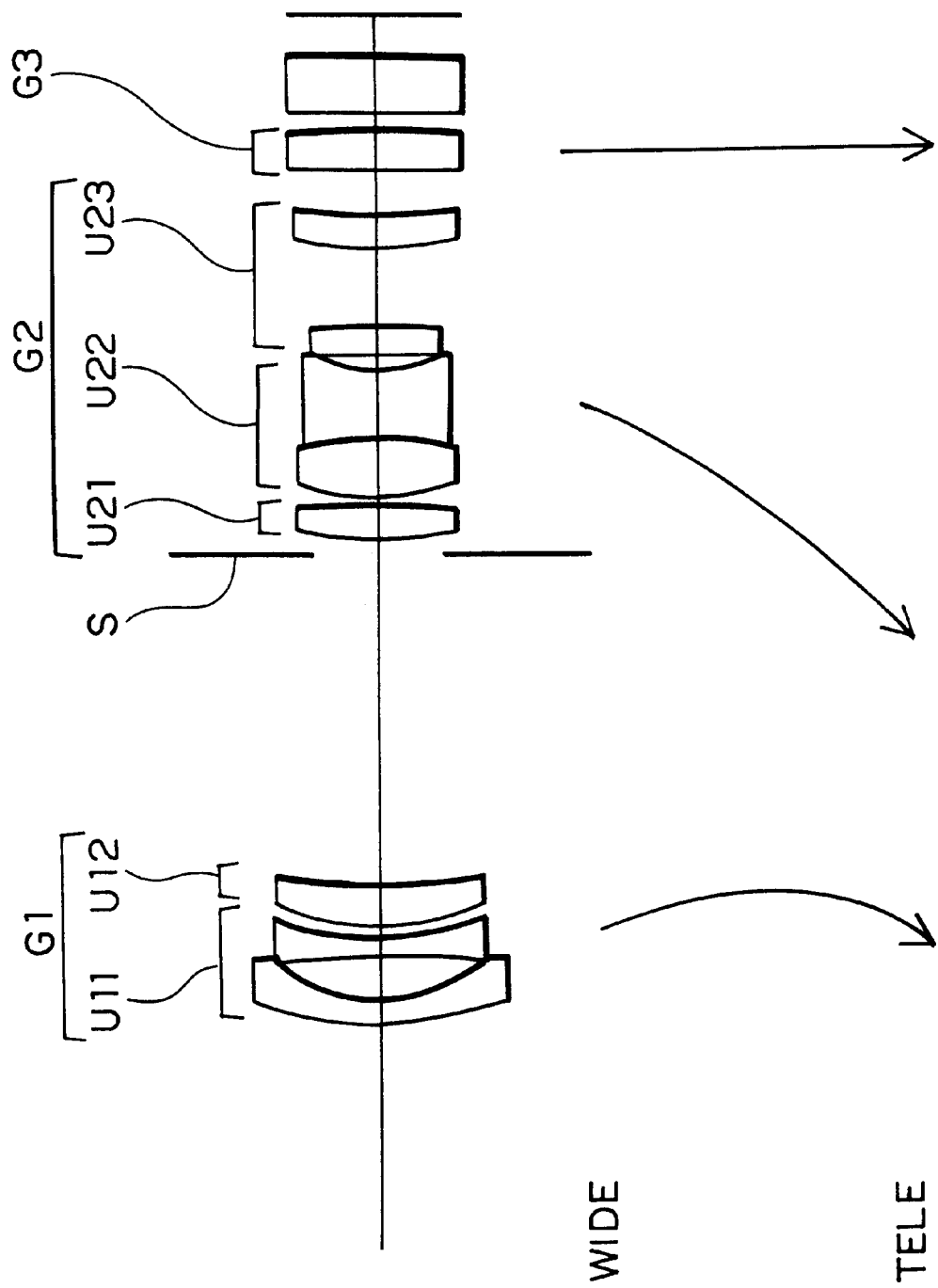
FIG. 5 is a view schematically showing the lens configuration of a variable focal length lens system according to Embodiment 5 of the present invention.
Figure 6:
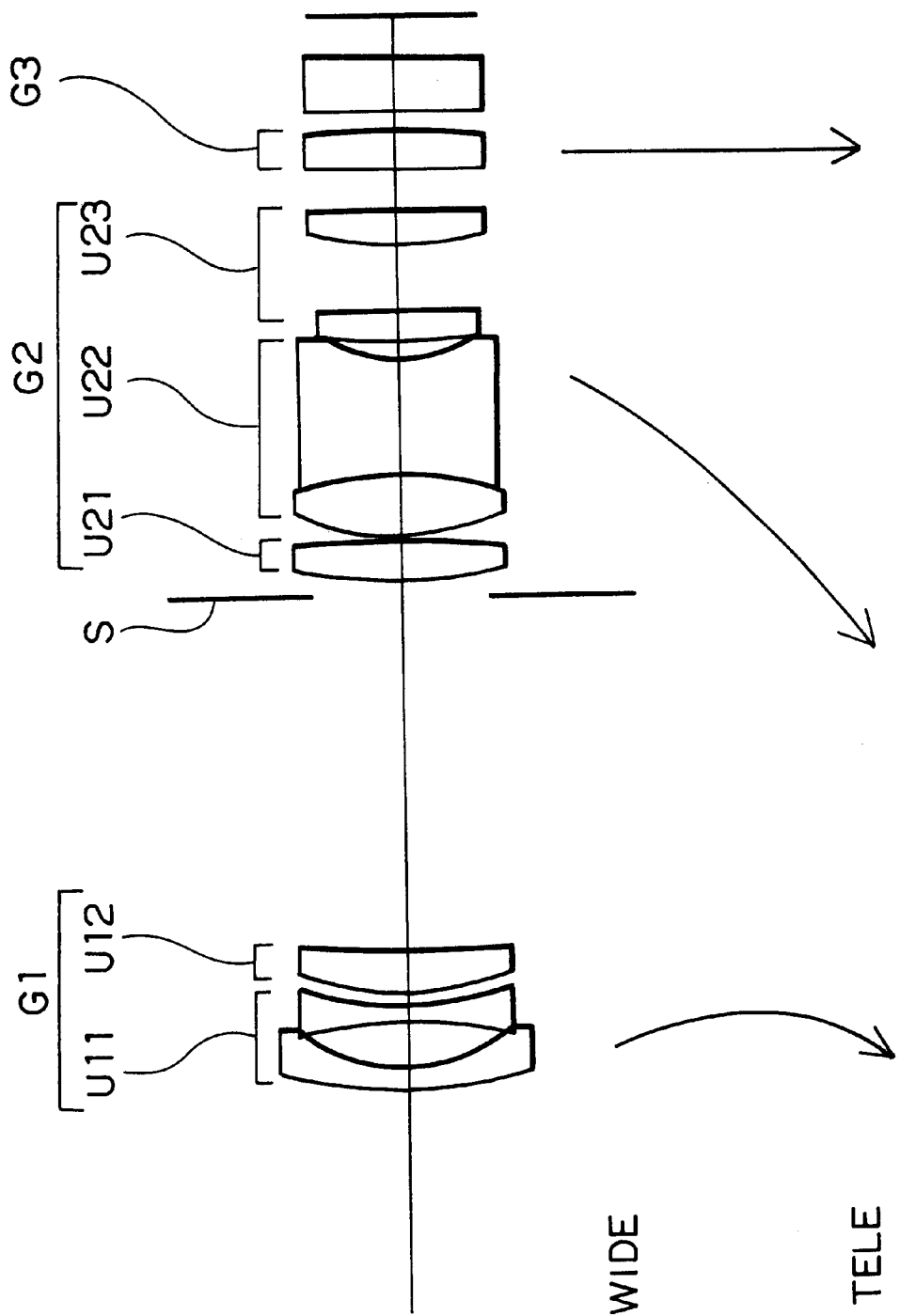
FIG. 6 is a view schematically showing the lens configuration of a variable focal length lens system according to Embodiment 6 of the present invention.

Each of the embodiments of the variable focal length lens system according to the present invention will be described below with reference to the accompanying drawings. FIGS. 1 through 6 are diagrams showing the construction of the lens systems according to the embodiments 1 through 6, respectively. Each embodiment has, in order from the object side, a first lens group G1 having negative refractive power, an aperture diaphragm S, a second lens group G2 having positive refractive power, and a third lens group G3 having positive refractive power. The first lens group GI consists of, in order from the object side, a lens unit 1-1 having negative refractive power denoted by U11 and a lens unit 1-2 having positive refractive power denoted by U12. The second lens group G2 consists of, in order from the object side, a lens unit 2-1 having positive refractive power denoted by U21, a lens unit 2-2 having negative refractive power denoted by U22, and a lens unit 2-3 having positive refractive power denoted by U23. The first and second lens groups are moved such that when a state of the lens group positions is changed from a wide-angle end state (a state providing the shortest focal length of the lens system) to a telephoto end state (a state providing the longest focal length of the lens system), a space between the first and second lens groups is decreased and a space between the second and third lens group is increased while the third lens group is fixed.

In each embodiment, the lens unit 1-1 U11 consists of, in order from the object side, a negative meniscus lens having a convex surface facing to the object side and a double concave negative lens. The lens unit 1-2 U12 consists of a positive meniscus lens having a convex surface facing to the object side. Further, in the embodiments 1 through 3, the most object side surface of the lens unit 1-1 U11 is an aspherical surface.

Furthermore, in each embodiment, the lens unit 2-2 U22 is constructed using a cemented lens consisting of, in order from the object side, a double convex positive lens and a double concave negative lens.

Moreover, in each embodiment, the third lens group G3 consists of a positive single lens having an aspherical surface facing to the image side.

In each embodiment described below, the focal length in the wide-angle end state is normalized to 1.

However, in each Embodiment 1 through 3, it is ideal for the focal length of the lens system in the wide-angle end state to be 5.8 mm. In each Embodiment 4 through 6, it is ideal for the focal length of the lens system in the wide-angle end state to be 8.24 mm.

It goes without saying that other focal lengths can suitably be used by applying proportional expansion or reduction.

<Embodiment 1>

In Table 1, various values of Embodiment 1 are shown. In Table 1, f denotes the focal length; Bf denotes the back focal length; F No denotes an F number; 2ω denotes an angle of view. In "Lens Data", the first column shows lens surface number, in order from the object side, the second column r shows radius of curvature of lens surface, the third column d shows distance between lens surfaces, the fourth column ν shows Abbe number, and the fifth column n shows refractive index for the d-line (λ=587.6 nm) respectively.

An aspherical surface is expressed by the following equation;

$$X(y)=y^2/[r\{1+(1-K \cdot y^2/r^2)^{1/2}\}]+C4 \cdot y^4+C6 \cdot y^6+C8 \cdot y^8+C10 \cdot y^{10}$$

where $X(y)$ denotes displacement along the optical axis from the tangent plane on the vertex of the aspherical surface to the aspherical surface at the height y, r denotes a paraxial radius of curvature, K denotes the conical coefficient, and Ci denotes the i-th order aspherical surface coefficient.

In "Variable Distance Data", the focal length and variable distance in the wide-angle end state, intermediate focal length state, and telephoto end state are shown. By the way, the similar symbols used in this embodiment are used for various values in all Embodiments following this.

TABLE 1

| Values on the whole | | | |
|---|---|---|---|
| | Wide-angle end | Intermediate | Telephoto end |
| f | 1.000 | 2.034 | 4.768 |
| Bf = 0.424 | | | |
| F NO | 1.86 | 2.45 | 4.00 |
| 2 ω | 80.78° | 42.61° | 18.15° |

| Lens Data | | | | |
|---|---|---|---|---|
| | r | d | ν | n |
| 1 | 4.4814 | 0.2203 | 52.32 | 1.75500 | aspherical surface |
| 2 | 1.7086 | 1.0685 | | |
| 3 | −5.4095 | 0.1864 | 70.24 | 1.48749 |
| 4 | 3.1858 | 0.0254 | | |
| 5 | 2.8000 | 0.5179 | 23.78 | 1.84666 |
| 6 | 6.7296 | (d6) | | |
| 7 | ∞ | 0.1695 | | | aperture diaphragm |
| 8 | 6.3456 | 0.4568 | 52.32 | 1.75500 |
| 9 | −5.0365 | 0.1695 | 23.78 | 1.84666 |
| 10 | −8.5438 | 0.0254 | | |
| 11 | 1.9093 | 0.7975 | 60.69 | 1.56384 |
| 12 | −4.4635 | 1.3384 | 34.96 | 1.80100 |
| 13 | 1.4288 | 0.2560 | | |
| 14 | 10.6870 | 0.3775 | 70.24 | 1.48749 |

TABLE 1-continued

| | | | | |
|---|---|---|---|---|
| 15 | −5.6077 | 0.0254 | | |
| 16 | 2.0229 | 0.4397 | 54.84 | 1.69100 |
| 17 | 4.8291 | (d17) | | |
| 18 | 2.9661 | 0.4008 | 55.18 | 1.66547 |
| 19 | 18.3950 | 0.1525 | | aspherical surface |
| 20 | ∞ | 0.5661 | 64.20 | 1.51680 |
| 21 | ∞ | | | |

Aspherical Surface Data

Surface Number 1

K = 1.00000
C4 = 4.9835 × $10^{-3}$
C6 = −7.25320 × $10^{-5}$
C8 = 6.12790 × $10^{-5}$
C10 = 0.00000

Surface Number 19

K = 1.00000
C4 = 3.28620 × $10^{-2}$
C6 = −1.77130 × $10^{-2}$
C8 = 6.61900 × $10^{-3}$
C10 = 0.00000

Variable Distance Data

| | Wide-angle end | Intermediate | Telephoto end |
|---|---|---|---|
| f | 1.00000 | 2.03388 | 4.76775 |
| d6 | 5.60273 | 2.21683 | 0.33898 |
| d17 | 0.33898 | 1.78337 | 5.60273 |

FIGS. 7A–7E, FIGS. 8A–8E and FIGS. 9A–9E show various aberrations of the first embodiment according to the present invention in the wide-angle end state, in the intermediate focal length state, and in the telephoto end state respectively. In each aberration chart, FNO denotes F-number, ω denotes angle of view, d denotes d-line (λ=587.6 nm), g denotes g-line (λ=435.6 nm) respectively. In the diagrams showing astigmatism, a solid line indicates a sagittal image plane and a broken line indicates a meridional plane. The similar symbols used in this embodiment are used in all diagrams showing aberrations of all embodiments. As is apparent from the respective diagrams showing the various aberrations, excellent correction is made for the various aberrations and good imaging quality is obtained.

<Embodiment 2>

In Table 2, various values of a lens system according to Embodiment 2 are shown.

TABLE 2

Values on the whole

| | Wide-angle end | Intermediate | Telephoto end |
|---|---|---|---|
| f | 1.000 | 2.034 | 4.768 |
| Bf = 0.424 | | | |
| F NO | 1.97 | 2.58 | 4.20 |
| 2 ω | 80.79° | 42.49° | 18.14° |

Lens Data

| | r | d | ν | n | |
|---|---|---|---|---|---|
| 1 | 4.5213 | 0.2203 | 52.32 | 1.75500 | aspherical surface |
| 2 | 1.6930 | 1.0212 | | | |
| 3 | −5.1258 | 0.1864 | 60.69 | 1.56384 | |
| 4 | 3.6093 | 0.0254 | | | |
| 5 | 3.0746 | 0.5285 | 23.78 | 1.84666 | |
| 6 | 11.3974 | (d6) | | | |
| 7 | ∞ | 0.1695 | | | aperture diaphragm |

TABLE 2-continued

| | | | | |
|---|---|---|---|---|
| 8 | 9.1185 | 0.3782 | 52.32 | 1.75500 |
| 9 | −10.4597 | 0.0254 | | |
| 10 | 2.7302 | 0.3876 | 47.82 | 1.75700 |
| 11 | 5.2755 | 0.0254 | | |
| 12 | 2.7963 | 0.5268 | 56.32 | 1.56883 |
| 13 | −9.2484 | 1.3584 | 23.78 | 1.84666 |
| 14 | 1.5499 | 0.3615 | | |
| 15 | −36.6490 | 0.3380 | 64.14 | 1.51633 |
| 16 | −5.4324 | 0.0254 | | |
| 17 | 2.4970 | 0.4117 | 34.96 | 1.80100 |
| 18 | 7.4341 | (d18) | | |
| 19 | 2.9661 | 0.3999 | 55.18 | 1.66547 |
| 20 | 17.6272 | 0.1525 | | aspherical surface |
| 21 | ∞ | 0.5661 | 64.20 | 1.51680 |
| 22 | ∞ | | | |

Aspherical Surface Data

Surface Number 1

K = 1.00000
C4 = 5.62654 × $10^{-3}$
C6 = −2.26951 × $10^{-4}$
C8 = 7.18615 × $10^{-5}$
C10 = 0.00000

Surface Number 19

K = 1.00000
C4 = 3.09998 × $10^{-2}$
C6 = −1.20857 × $10^{-2}$
C8 = 2.53168 × $10^{-3}$
C10 = 0.00000

Variable Distance Data

| | Wide-angle end | Intermediate | Telephoto end |
|---|---|---|---|
| f | 1.00000 | 2.03390 | 4.76779 |
| d6 | 5.68836 | 2.24738 | 0.33899 |
| d18 | 0.33898 | 1.80687 | 5.68835 |

FIGS. 10A–10E, FIGS. 11A–11E and FIGS. 12A–12E show various aberrations of the Embodiment 2 according to the present invention in the wide-angle end state, in the intermediate focal length state, and in the telephoto end state respectively. As is apparent from the respective diagrams showing the various aberrations, excellent correction is made for the various aberrations and good imaging quality is obtained.

<Embodiment 3>

In Table 3, various values of a lens system according to Embodiment 3 are shown.

TABLE 3

Values on the whole

| | Wide-angle end | Intermediate | Telephoto end |
|---|---|---|---|
| f | 1.000 | 2.034 | 3.559 |
| Bf = 0.589 | | | |
| F NO | 2.14 | 2.92 | 4.09 |
| 2 ω | 80.78° | 42.22° | 24.26° |

Lens Data

| | r | d | ν | n | |
|---|---|---|---|---|---|
| 1 | 7.1958 | 0.2203 | 46.54 | 1.80411 | aspherical surface |
| 2 | 1.7074 | 0.8474 | | | |
| 3 | −9.4057 | 0.1864 | 46.54 | 1.80411 | |
| 4 | 2.9519 | 0.1695 | | | |
| 5 | 3.1662 | 0.5423 | 23.78 | 1.84666 | |
| 6 | −29.2772 | (d6) | | | |
| 7 | ∞ | 0.1695 | | | aperture diaphragm |

TABLE 3-continued

| | | | | |
|---|---|---|---|---|
| 8 | 6.2712 | 0.5084 | 42.97 | 1.83500 |
| 9 | -9.6191 | 0.0339 | | |
| 10 | 1.9296 | 0.6779 | 47.19 | 1.67003 |
| 11 | -4.1119 | 0.7627 | 23.78 | 1.84666 |
| 12 | 1.5233 | 0.2542 | | |
| 13 | 6.7094 | 0.4237 | 32.17 | 1.67270 |
| 14 | -8.8116 | 0.0339 | | |
| 15 | 5.2908 | 0.4237 | 53.93 | 1.71300 |
| 16 | 12.3765 | (d16) | | |
| 17 | 6.7793 | 0.4237 | 55.18 | 1.66547 |
| 18 | -5.7643 | 0.1695 | | aspherical surface |
| 19 | ∞ | 0.5661 | 67.85 | 1.45850 |
| 20 | ∞ | | | |

Aspherical Surface Data

Surface Number 1

K = 1.00000
$C4 = 1.07998 \times 10^{-2}$
$C6 = -1.44312 \times 10^{-3}$
$C8 = 1.80087 \times 10^{-4}$
C10 = 0.00000

Surface Number 18

K = 1.00000
$C4 = 3.85952 \times 10^{-2}$
$C6 = -2.16450 \times 10^{-2}$
$C8 = 9.41230 \times 10^{-3}$
C10 = 0.00000

Variable Distance Data

| | Wide-angle end | Intermediate | Telephoto end |
|---|---|---|---|
| f | 1.00000 | 2.03378 | 3.55912 |
| d6 | 4.45305 | 1.60239 | 0.42060 |
| d18 | 0.55151 | 2.15459 | 4.51993 |

FIGS. 13A–13E, FIGS. 14A–14E and FIGS. 15A–15E show various aberrations of the Embodiment 3 according to the present invention in the wide-angle end state, in the intermediate focal length state, and in the telephoto end state respectively. As is apparent from the respective diagrams showing the various aberrations, excellent correction is made for the various aberrations and good imaging quality is obtained.

<Embodiment 4>

In Table 4, various values of a lens system according to Embodiment 4 are shown.

TABLE 4

Values on the whole

| | Wide-angle end | Intermediate | Telephoto end |
|---|---|---|---|
| f | 1.000 | 1.456 | 2.867 |
| Bf = 0.306 | | | |
| F NO | 2.57 | 2.96 | 4.14 |
| 2 ω | 62.20° | 43.03° | 22.01° |

Lens Data

| | r | d | ν | n | |
|---|---|---|---|---|---|
| 1 | 2.9394 | 0.1578 | 54.66 | 1.72916 | |
| 2 | 1.0611 | 0.3519 | | | |
| 3 | -5.0841 | 0.1335 | 70.24 | 1.48749 | |
| 4 | 2.2896 | 0.0789 | | | |
| 5 | 1.5413 | 0.2791 | 23.78 | 1.84666 | |
| 6 | 2.5303 | (d6) | | | |
| 7 | ∞ | 0.1214 | | | aperture diaphragm |
| 8 | 4.0796 | 0.2670 | 46.58 | 1.80400 | |
| 9 | -4.0796 | 0.0243 | | | |

TABLE 4-continued

| | | | | | |
|---|---|---|---|---|---|
| 10 | 1.0805 | 0.4005 | 38.02 | 1.60342 | |
| 11 | -3.3901 | 0.4248 | 23.78 | 1.84666 | |
| 12 | 0.9223 | 0.1092 | | | |
| 13 | 3.7115 | 0.2184 | 70.24 | 1.48749 | |
| 14 | 36.4061 | 0.6250 | | | |
| 15 | 2.5702 | 0.3883 | 46.58 | 1.80400 | |
| 16 | 34.6151 | (d16) | | | |
| 17 | 7.7356 | 0.3034 | 55.18 | 1.66547 | |
| 18 | -5.1578 | 0.1214 | | | aspherical surface |
| 19 | ∞ | 0.4053 | 64.20 | 1.51680 | |
| 20 | ∞ | | | | |

Aspherical Surface Data

Surface Number 18

K = 1.00000
$C4 = 1.21469 \times 10^{-1}$
$C6 = -1.82268 \times 10^{-1}$
$C8 = 4.21168 \times 10^{-1}$
$C10 = -3.89534 \times 10^{-1}$ Variable Distance Data

| | Wide-angle end | Intermediate | Telephoto end |
|---|---|---|---|
| f | 1.00000 | 1.45631 | 2.83737 |
| d6 | 2.48829 | 1.46045 | 0.36407 |
| d16 | 0.32269 | 0.90441 | 2.66504 |

FIGS. 16A–16E, FIGS. 17A–17E and FIGS. 18A–18E show various aberrations of the Embodiment 4 according to the present invention in the wide-angle end state, in the intermediate focal length state, and in the telephoto end state respectively. As is apparent from the respective diagrams showing the various aberrations, excellent correction is made for the various aberrations and good imaging quality is obtained.

<Embodiment 5>

In Table 5, various values of a lens system according to Embodiment 5 are shown.

TABLE 5

Values on the whole

| | Wide-angle end | Intermediate | Telephoto end |
|---|---|---|---|
| f | 1.000 | 1.456 | 2.837 |
| Bf = 0.306 | | | |
| F NO | 2.59 | 3.00 | 4.22 |
| 2 ω | 62.20° | 43.05° | 22.03° |

Lens Data

| | r | d | ν | n | |
|---|---|---|---|---|---|
| 1 | 2.9586 | 0.1578 | 46.58 | 1.80400 | |
| 2 | 1.0963 | 0.3337 | | | |
| 3 | -7.7454 | 0.1335 | 60.29 | 1.62041 | |
| 4 | 2.0308 | 0.0728 | | | |
| 5 | 1.6103 | 0.3034 | 23.78 | 1.84666 | |
| 6 | 3.7716 | (d6) | | | |
| 7 | ∞ | 0.1214 | | | aperture diaphragm |
| 8 | 3.1513 | 0.2670 | 46.58 | 1.80400 | |
| 9 | -6.3690 | 0.0243 | | | |
| 10 | 1.3178 | 0.4733 | 44.89 | 1.63930 | |
| 11 | -1.9806 | 0.4854 | 26.30 | 1.78470 | |
| 12 | 1.0076 | 0.1092 | | | |
| 13 | 13.6664 | 0.2366 | 70.24 | 1.48749 | |
| 14 | -3.6716 | 0.5400 | | | |
| 15 | 2.0634 | 0.2731 | 39.59 | 1.80440 | |
| 16 | 5.0199 | (d16) | | | |
| 17 | 15.3344 | 0.3034 | 55.18 | 1.66547 | |
| 18 | -5.0113 | 0.1214 | | | aspherical surface |

TABLE 5-continued

| | | | | |
|---|---|---|---|---|
| 19 | ∞ | 0.4053 | 64.10 | 1.51680 |
| 20 | ∞ | | | |

Aspherical Surface Data

Surface Number 18

K = 1.00000
C4 = 9.21138 × 10$^{-2}$
C6 = −1.07397 × 10$^{-2}$
C8 = 2.28032 × 10$^{-3}$
C10 = −3.03751 × 10$^{-2}$

Variable Distance Data

| | Wide-angle end | Intermediate | Telephoto end |
|---|---|---|---|
| f | 1.00000 | 1.45631 | 2.83737 |
| d6 | 2.45187 | 1.44190 | 0.36459 |
| d16 | 0.31041 | 0.85279 | 2.49435 |

FIGS. 19A–19E, FIGS. 20A–20E and FIGS. 21A–21E show various aberrations of the Embodiment 5 according to the present invention in the wide-angle end state, in the intermediate focal length state, and in the telephoto end state respectively. As is apparent from the respective diagrams showing the various aberrations, excellent correction is made for the various aberrations and good imaging quality is obtained.

<Embodiment 6>

In Table 6, various values of a lens system according to Embodiment 6 are shown.

TABLE 6

Values on the whole

| | Wide-angle end | Intermediate | Telephoto end |
|---|---|---|---|
| f | 1.000 | 1.456 | 2.837 |
| Bf = 0.306 | | | |
| F NO | 2.07 | 2.38 | 3.32 |
| 2 ω | 62.24° | 42.97° | 21.99° |

Lens Data

| | r | d | ν | n | |
|---|---|---|---|---|---|
| 1 | 3.3344 | 0.1578 | 46.58 | 1.80400 | |
| 2 | 1.1990 | 0.3398 | | | |
| 3 | −3.8574 | 0.1335 | 55.34 | 1.67790 | |
| 4 | 2.5779 | 0.0850 | | | |
| 5 | 2.1254 | 0.3155 | 23.78 | 1.84666 | |
| 6 | 11.1743 | (d6) | | | |
| 7 | ∞ | 0.1214 | | | aperture diaphragm |
| 8 | 3.1547 | 0.3155 | 46.58 | 1.80400 | |
| 9 | −6.3777 | 0.0243 | | | |
| 10 | 1.7098 | 0.4794 | 44.89 | 1.63930 | |
| 11 | −2.0650 | 0.8495 | 26.30 | 1.78470 | |
| 12 | 1.1352 | 0.1153 | | | |
| 13 | 3.6297 | 0.2366 | 70.24 | 1.48749 | |
| 14 | −111.3138 | 0.4794 | | | |
| 15 | 2.4154 | 0.2609 | 46.58 | 1.80400 | |
| 16 | 20.2529 | (d16) | | | |
| 17 | 14.4541 | 0.3034 | 57.44 | 1.60602 | |
| 18 | −4.2949 | 0.1214 | | | aspherical surface |
| 19 | ∞ | 0.4053 | 64.20 | 1.51680 | |
| 20 | ∞ | | | | |

Aspherical Surface Data

Surface Number 18

K = 1.00000
C4 = 2.01885 × 10$^{-1}$

TABLE 6-continued

C6 = −5.75443 × 10$^{-1}$
C8 = 1.44367
C10 = −1.43251

Variable Distance Data

| | Wide-angle end | Intermediate | Telephoto end |
|---|---|---|---|
| f | 1.00000 | 1.45631 | 2.83737 |
| d6 | 2.64248 | 1.54004 | 0.36408 |
| d16 | 0.31278 | 0.89799 | 2.66920 |

FIGS. 22A–22E, FIGS. 23A–23E and FIGS. 24A–24E show various aberrations of the Embodiment 6 according to the present invention in the wide-angle end state, in the intermediate focal length state, and in the telephoto end state respectively. As is apparent from the respective diagrams showing the various aberrations, excellent correction is made for the various aberrations and good imaging quality is obtained.

Further, various values for the parameters in each condition in accordance with Embodiment 1 through 6 are shown in Table 7.

TABLE 7

<Values for the conditions>

| | Embodiment 1 | Embodiment 2 | Embodiment 3 |
|---|---|---|---|
| (1) f2 / \|f1\| | 1.069 | 1.089 | 1.137 |
| (2) f3 / fw | 5.259 | 5.301 | 4.746 |
| (3) f12 / \|f1\| | 1.872 | 1.697 | 1.311 |
| (4) \|f22\| / f2 | 2.692 | 1.226 | 3.537 |
| (5) (D1w − D1t) / fw | 5.264 | 5.349 | 4.032 |
| (6) (D2t − D2w) / fw | 5.264 | 5.349 | 3.968 |

| | Embodiment 4 | Embodiment 5 | Embodiment 6 |
|---|---|---|---|
| (1) f2 / \|f1\| | 1.066 | 1.035 | 1.110 |
| (2) f3 / fw | 4.694 | 5.710 | 5.497 |
| (3) f12 / \|f1\| | 2.017 | 1.648 | 1.595 |
| (4) \|f22\| / f2 | 2.597 | 3.227 | 2.329 |
| (5) (D1w −D1t) / fw | 2.124 | 2.087 | 2.278 |
| (6) (D2t −D2w) / fw | 2.342 | 2.184 | 2.356 |

As described above, the present invention makes it possible to provide a variable focal length lens system having a zoom ratio of 2.5 or over, a field angle of 60° or over at the wide-angle end, and an excellent imaging quality which is suited for use with a video camera or a digital still camera employing solid-state imaging device and the like.

What is claimed is:

1. A variable focal length lens system comprising, in order from an object side:

a first lens group having negative refractive power;

a second lens group having positive refractive power; and a third lens group having positive refractive power;

wherein the first lens group includes, in order from the object side, a lens unit (1-1) having negative refractive power and a lens unit (1-2) having positive refractive power separated by predetermined air space; and wherein the second lens group includes, in order from the object side, a lens unit (2-1) having positive refractive power, a lens unit (2-2) having negative refractive power separated by predetermined air space, and a lens unit (2-3) having positive refractive power separated by predetermined air space;

with the first and second lens groups being moved such that when a state of the lens group positions is changed from a wide-angle end state to a telephoto end state, a space between the first and second lens groups decreases and a space between the second and third lens groups increases while the third lens group is fixed;

and wherein the following conditions are satisfied:

| | |
|---|---|
| $0.7 < f2/|f1| < 1.5$ | $(f1 < 0)$ |
| $3 < f3/fw < 10$ | |
| $1 < f12/|f1| < 3$ | $(f1 < 0)$ |
| $1 < |f22|/f2 < 5$ | $(f22 < 0)$ |
| $1.6 < (D1w - D1t)/fw < 6$ | |
| $1.6 < (d2t - D2w)/fw < 6$ | | where f1 denotes the focal length of the first lens group, f2 denotes the focal length of the second lens group, f3 denotes the focal length of the third lens group, fw denotes the focal length of the lens system in the wide-angle end state, f12 denotes the focal length of the lens unit (1-2), f22 denotes the focal length of the lens unit (2-2), D1w denotes the space between the first lens group and the second lens group at the wide-angle end state, D1t denotes the space between the first lens group and the second lens group in the telephoto end state, D2w denotes the space between the second lens group and the third lens group in the wide-angle end state, and D2t denotes the space between the second lens group and the third lens group at the telephoto end state.

2. A variable focal length lens system according to claim 1, wherein the lens unit (1-1) comprises, in order from the object side, a negative meniscus lens having a convex surface facing to the object side and a double concave negative lens; and the lens unit (1-2) comprises a positive meniscus lens having a convex surface facing to the object side.

3. A variable focal length lens system according to claim 1, wherein the most object side surface of the lens unit (1-1) is an aspherical surface.

4. A variable focal length lens system according to claim 1, wherein the lens unit (2-2) comprises a cemented lens comprising, in order from the object side, a double convex positive lens and a double concave negative lens.

5. A variable focal length lens system according to claim 1, wherein a condition $$0.9 < f2/|f1| < 1.3$$

is satisfied.

6. A variable focal length lens system according to claim 1, wherein a condition $$4 < f3/fw < 6$$

is satisfied.

7. A variable focal length lens system according to claim 1, wherein a condition $$1.2 < f12/|f1| < 2.3$$

is satisfied.

8. A variable focal length lens system according to claim 1, wherein a condition $$1.1 < |f22|/f2 < 4$$

is satisfied.

9. A variable focal length lens system according to claim 1, wherein a condition $$1.9 < (D1w - D1t)/fw < 5.5$$

is satisfied.

10. A variable focal length lens system according to claim 1, wherein a condition $$1.9 < (D2t - D2w)/fw < 5.5$$

is satisfied.

11. A variable focal length lens system according to claim 1, wherein the third lens group comprises a positive single lens having at least one aspherical surface.

* * * * *